US011631353B2

(12) United States Patent
Russell

(10) Patent No.: US 11,631,353 B2
(45) Date of Patent: Apr. 18, 2023

(54) WARPING FOR LASER BEAM SCANNING DISPLAYS USING EYE TRACKING

(71) Applicant: Magic Leap, Inc., Plantation, FL (US)

(72) Inventor: Andrew Ian Russell, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/326,034

(22) Filed: May 20, 2021

(65) Prior Publication Data

US 2021/0366334 A1 Nov. 25, 2021

Related U.S. Application Data

(60) Provisional application No. 63/028,411, filed on May 21, 2020.

(51) Int. Cl.
| | |
|---|---|
| *G09G 3/00* | (2006.01) |
| *G06F 3/01* | (2006.01) |
| *G09G 3/02* | (2006.01) |
| *G06T 3/00* | (2006.01) |

(52) U.S. Cl.
CPC ............. *G09G 3/007* (2013.01); *G06F 3/013* (2013.01); *G06T 3/0093* (2013.01); *G09G 3/02* (2013.01); *G09G 2354/00* (2013.01)

(58) Field of Classification Search
CPC ................................. G09G 3/007; G06F 3/013
See application file for complete search history.

(56) References Cited

U.S. PATENT DOCUMENTS

| | | | |
|---|---|---|---|
| 8,970,495 B1 | 3/2015 | Biffle et al. | |
| 9,406,166 B2 | 8/2016 | Futterer | |
| 11,481,870 B2 | 10/2022 | Russell | |
| 2014/0185142 A1 | 7/2014 | Gupta et al. | |
| 2019/0156100 A1* | 5/2019 | Rougeaux | G06F 3/013 |
| 2019/0260931 A1* | 8/2019 | Rodriguez | H04N 5/23241 |
| 2019/0287495 A1 | 9/2019 | Mathur et al. | |
| 2020/0041802 A1* | 2/2020 | Osterhout | G10L 15/20 |
| 2021/0366077 A1 | 11/2021 | Russell | |

OTHER PUBLICATIONS

Application No. PCT/US2021/033503, International Search Report and Written Opinion, dated Aug. 24, 2021, 7 pages.

(Continued)

*Primary Examiner* — Shivang I Patel
(74) *Attorney, Agent, or Firm* — Kilpatrick Townsend & Stockton LLP

(57) ABSTRACT

Embodiments transform an image frame based on a position of pupils of a viewer to eliminate visual artefacts formed on an image frame displayed on a scanning-type display device. An MR system obtains a first image frame corresponding to a first view perspective associated with a first pupil position. The system receives data from an eye tracking device, determines a second pupil position, and generates a second image frame corresponding to a second view perspective associated with the second pupil position. A first set of pixels of the second image frame are shifted by a first shift value, and a second set of pixels of the second image frame are shifted by a second shift value, where the shift values are calculated based on at least the second pupil position. The system transmits the second image frame to a near-eye display device to be displayed thereon.

18 Claims, 24 Drawing Sheets

(56) References Cited

OTHER PUBLICATIONS

Application No. PCT/US2021/033504, International Search Report and Written Opinion, dated Aug. 24, 2021, 7 pages.
U.S. Appl. No. 17/326,036, "Non-Final Office Action", dated Mar. 23, 2022, 11 pages.
U.S. Appl. No. 17/326,036, "Notice of Allowance", dated Jun. 13, 2022, 5 pages.
Application No. PCT/US2021/033503, "International Preliminary Report on Patentability", dated Dec. 1, 2022, 6 pages.
Application No. PCT/US2021/033504, "International Preliminary Report on Patentability", dated Dec. 1, 2022, 6 pages.

* cited by examiner

WARPING FOR LASER BEAM SCANNING DISPLAYS USING EYE TRACKING

CROSS-REFERENCE TO RELATED APPLICATIONS

This application claims the benefit of priority to U.S. Provisional Patent Application No. 63/028,411, filed May 21, 2020, entitled "WARPING FOR LASER BEAM SCANNING DISPLAYS USING EYE TRACKING," the entire content of which is incorporated herein by reference for all purposes.

The following regular U.S. patent applications (including this one) are being filed concurrently, and the entire disclosure of the other applications are incorporated by reference into this application for all purposes:

U.S. patent application Ser. No. 17/326,034, filed May 20, 2021, entitled "WARPING FOR LASER BEAM SCANNING DISPLAYS USING EYE TRACKING;" and U.S. patent application Ser. No. 17/326,036, filed May 20, 2021, entitled "WARPING FOR SPATIAL LIGHT MODULATING DISPLAYS USING EYE TRACKING."

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems typically employ wearable display devices (e.g., head-worn displays, helmet-mounted displays, or smart glasses) that are at least loosely coupled to a user's head. Various optical systems generate images at various depths for displaying MR (VR and AR) scenarios.

According to various scenarios, the user may change the position of their head or simply their eyes (i.e., their gaze). Changes in viewer's head and/or pupil position present challenges to laser beam scanning display technology and introduces artefacts, such as slew and misstitch, on the displayed images.

SUMMARY

Described herein are techniques and technologies to improve image quality of laser beam scanning displays subject to user moving their eyes, thereby modifying their direction of gaze (e.g. line of sight).

As an example, if a user wearing a head-worn display device views a virtual object and moves their eyes to look at a different direction (e.g. follows the virtual object when the virtual object moves, or chooses to look at a different object), the virtual object can be rendered based on the user's field of view as determined by the position of their pupils. A change in a user's pupil position requires adjusting how an image frame will be displayed on the laser beam scanning displays.

Some embodiments provide a method for transforming an image frame based on a position of pupils of a viewer. The method may include obtaining, by a computing device, a first image frame. The first image frame corresponds to a first view perspective associated with a first position of the pupils of the viewer. The method may also include determining, by the computing device, a second position of the pupils of the viewer. The computing device may generate, based on the first image frame, a second image frame corresponding to a second view perspective associated with the second position of the pupils of the viewer. The generating may include shifting a first set of pixels of the second image frame by a first shift value calculated based on at least the second position of the pupils of the viewer, and shifting a second set of pixels of the second image frame by a second shift value calculated based on at least the second position of the pupils of the viewer. The second image frame may be transmitted to a near-eye display device to be displayed on the near-eye display device. In some embodiments, the first view perspective is also associated with a first head position of the viewer, and the method further comprises estimating, by the computing device, a second head position of the viewer; and generating, by the computing device, an intermediary warped image frame from the first image frame using the second head position of the viewer. The second image frame is generated using the intermediary warped image frame.

In some embodiments, the method may also include receiving, by the computing device from an eye tracking device, data associated with the position of the pupils of the viewer, wherein the second position of the pupils is determined based on the data received from the eye tracking device.

In some embodiments, the method may include calculating a first eye velocity as a function of the first position of the pupils, the second position of the pupils and a time elapsed for the pupils of the viewer to get from the first position to the second position. The first eye velocity is calculated with respect to the near-eye display device. The method may also include calculating a second eye velocity; and calculating, by the computing device, the first shift value based on the first eye velocity and the second shift value based on the second eye velocity. In some embodiments, the method may include calculating, by the computing device, the second shift value based on the first shift value and a subsequent position of the pupils of the viewer.

Various embodiments provide a system including one or more processors for performing the method for transforming an image frame based on a position of pupils of a viewer, as described above.

Embodiments provide a non-transitory computer-readable medium having stored thereon a sequence of instructions which, when executed by one or more processors, causes the processors to execute the method for transforming an image frame based on a position of pupils of a viewer, as described above.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

The present disclosure relates to MR systems including laser beam scanning display systems projecting image frames where visual artefacts such as slew and misstitch are eliminated using eye tracking data, and methods for generating a mixed reality experience content using the same.

In some embodiments, the MR system may include more than one (e.g. two) scanning sources (e.g. lasers) scanning simultaneously. For example, while one laser may scan from the top of the display to the middle of the display, and the second laser may start at the middle of the display and scan to the bottom of the display. Each laser may have a predetermined scan pattern (e.g. scan row-by-row; or scan odd rows first, and the continue with even rows). Accordingly, the visual artefacts formed on the displayed images may include a vertical line that splits the displayed object in the middle where each half (e.g. the top half and bottom half) is independent: they are separated in the middle, there is a diagonal line, a gap and a slightly diagonal line below that. Displayed objects may end up with two diagonal lines that are detached. Embodiments provide solutions to eliminate this and other visual artefacts using eye tracking data for warping the rendered image frame.

Various embodiments of the disclosure are directed to systems, methods, and articles of manufacture for enhanced warping virtual content using data from an eye tracking device for a laser beam scanning display device. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Illustrative Mixed Reality Scenario and System

The description that follows pertains to an illustrative augmented reality system with which the eye tracking enhanced warping system may be practiced. However, it is to be understood that the embodiments also lend themselves to applications in other types of display systems (including other types of mixed reality systems), and therefore the embodiments are not to be limited to only the illustrative system disclosed herein.

Figure 1:
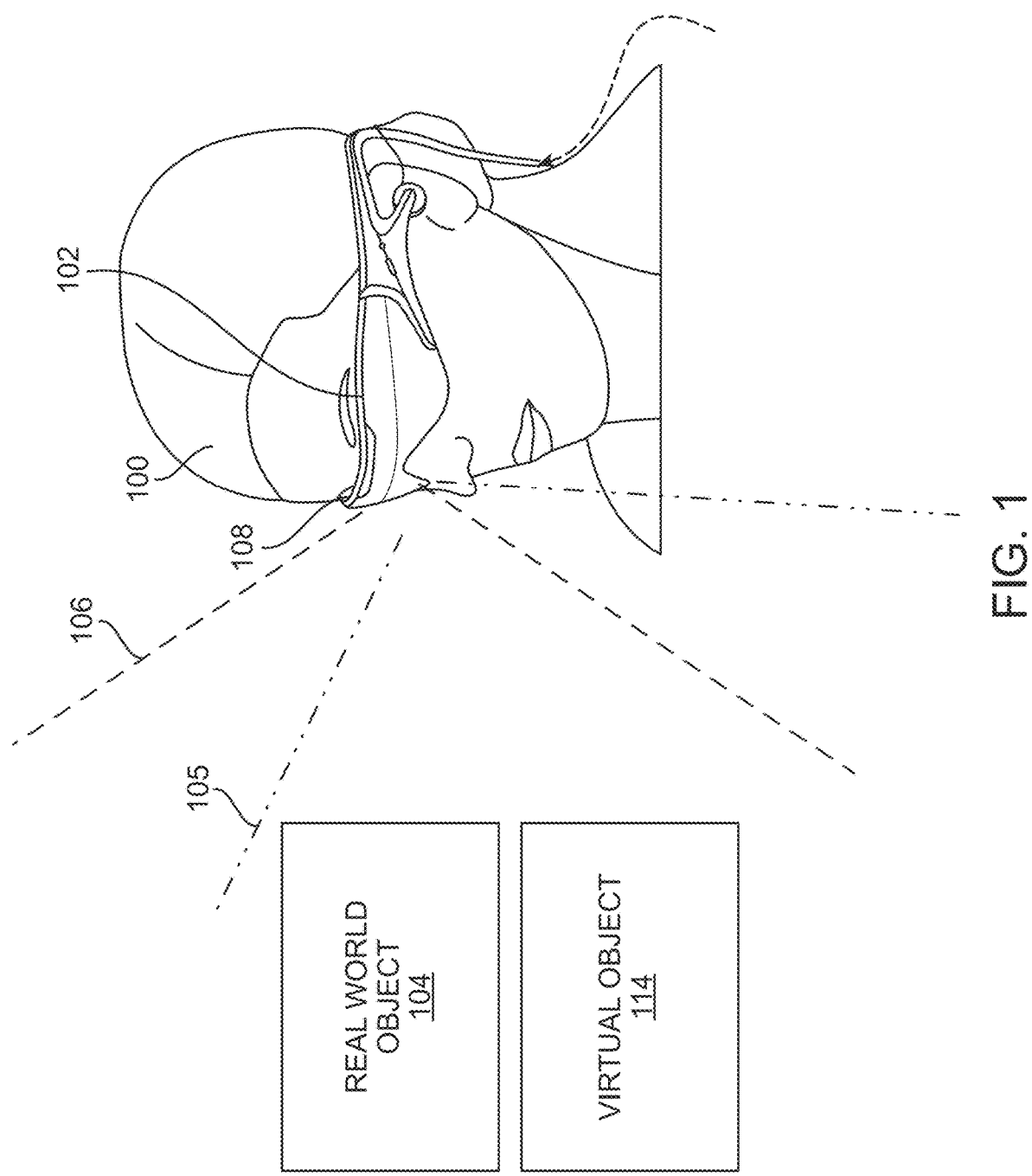
FIG. 1 schematically depicts an exemplary mixed reality (e.g., VR or AR) system with a real world object and a virtual object in the user's field of view, according to some embodiments.

Mixed reality (MR) scenarios often include presentation of virtual content (e.g., images and sound) corresponding to virtual objects in relationship to real-world objects. For example, referring to FIG. 1, a user 100 of an MR device 102 including a headset (e.g. wearable component) sees a real-world, physical object 104. According to various embodiments, a virtual object 114 may be rendered on a near-eye display device (e.g. a laser beam scanning display device) of the MR device 102 with respect to the real-world object 104. For example, the real-world object 104 may be in the form of a table, and a virtual fairy (as an exemplary virtual object 114) may be rendered on the display device as being placed on the table. The MR device 102 must also account for the user's gaze (e.g. line of sight) used to generate/render the real-world object 104 as well as the virtual object 114. For example, the user 100 may move their eyes from a first position providing a first field of view 105 to a second position providing a second field of view 106. While the position of the real-world object 104 remains the same with respect to the real-world coordinates, the position of the real-world object 104 shifts within the field of view of the user (e.g. the real-world object 104 is closer to the edge of the first field of view 105 and is in the middle of the second field of view 106). Unless properly processed, the change in user's pupil position may result in the virtual object 114 to appear slewed or broken (e.g. misstitched) on near-eye display device of the MR device 102. These artefacts on the displayed image frame are discussed below in greater detail.

According to various embodiments, data from an eye tracking device 108 coupled to the MR device 102 may be used to render the virtual object 114 properly on the near-eye display device. Such eye tracking data may, for example, be discerned by projecting light at the end user's eyes, and detecting the return or reflection of at least some of that projected light. The eye tracking device 108 may output the pixel index of the display device where the user's gaze is directed at. For example, the eye tracking device 108 may determine a first position of the user's pupils as the center pixel of the display device at time $t_1$ and a second position of the user's pupils as 10 pixels to the right of the center pixel at time $t_2$. According to some embodiments, the MR device 102 may be able to calculate the eye velocity for the user as a function of the first position, the second position and the difference $\Delta t$ between time $t_1$ and time $t_2$. According to various embodiments discussed herein, the system may calculate a different eye velocity for each unit of the scanning pattern (e.g. different eye velocity for each row, if scanning per row).

For example, the MR device 102 may obtain a first image frame corresponding to a first position of the user's pupils (illustrated by normal vector 115 to user's pupils) associated with the first field of view 105. The MR device 102 may receive data from the eye tracking device 108 and determine a second position (illustrated by normal vector 116 to user's pupils) of the user's pupils associated with the second field of view 106 using the data from the eye tracking device 108. The MR device 102 may then generate a second image frame corresponding to the second field of view 106 by performing, among other steps, a shift of one or more sets of pixels (e.g. rows) of the second image based at least on the first position, and the second position of the user's pupils. In some embodiments, the second image frame may be generated using a head pose based warp, and the pixels of the second image frame may be shifted as described herein to correct the visual artefacts. The details of the shift, as well as the additional steps that may be performed, are described below in greater detail.

Figure 2:
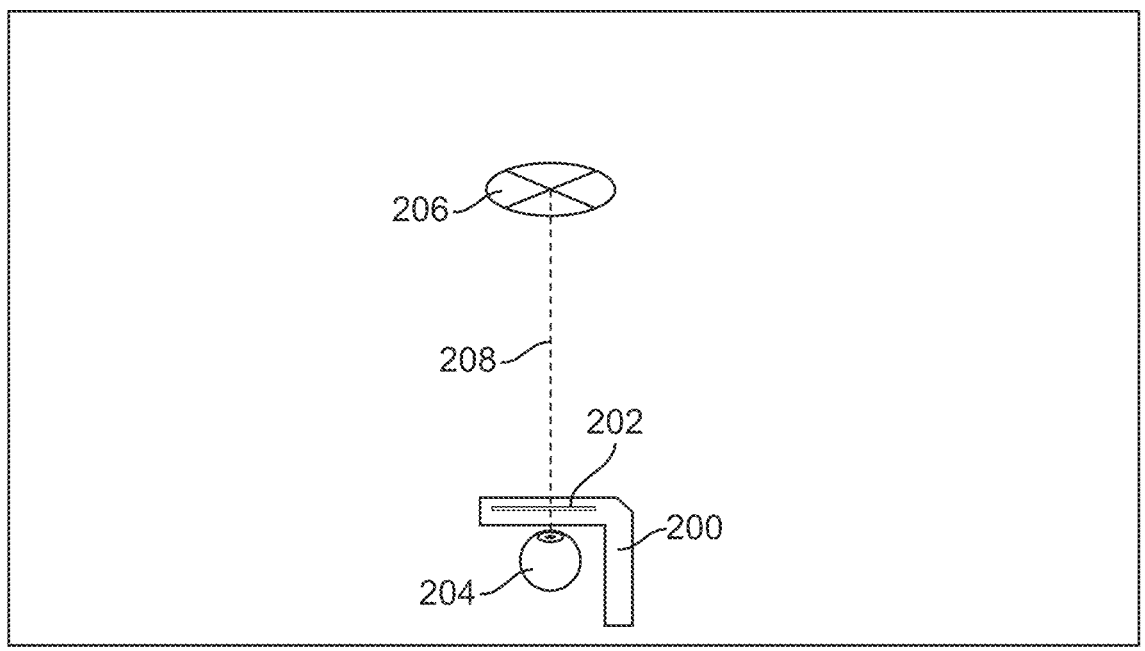
FIG. 2 schematically depicts an exemplary mixed reality system illustrating the user's eyeball with a real world or virtual object in the user's line of sight, according to some embodiments.

FIG. 2 is a schematic representation of an exemplary AR/VR headset 200 with respect to an eyeball of a user of the headset 200. The headset 200 includes a display device 202 (e.g. a laser beam scanning display) which is positioned in front of the user's eyeball 204. An eye tracking device coupled to the headset 200 may track the position of the user's eyeball 204 (e.g. user's pupils). The user's line of sight 208 may be directed to a real or a virtual object 206.

According to various embodiments, data from the eye tracking device may be used to correctly render the real or a virtual object 206 on the display device 202 based on the user's line of sight or any change in the user's line of sight. For example, if different sets of pixels (e.g. different rows) of the rendered image frame may be shifted by different shift values to generate the image frame to be displayed on the laser beam scanning display device. According to various embodiments, the shift values may be determined based on the data provided by the eye tracking device. For example, the MR system may calculate the eye velocity of the user's pupils. A different eye velocity value may be calculated for each shift (e.g. in case of a per-row shift, a different eye velocity may be used for each row).

Figure 3:
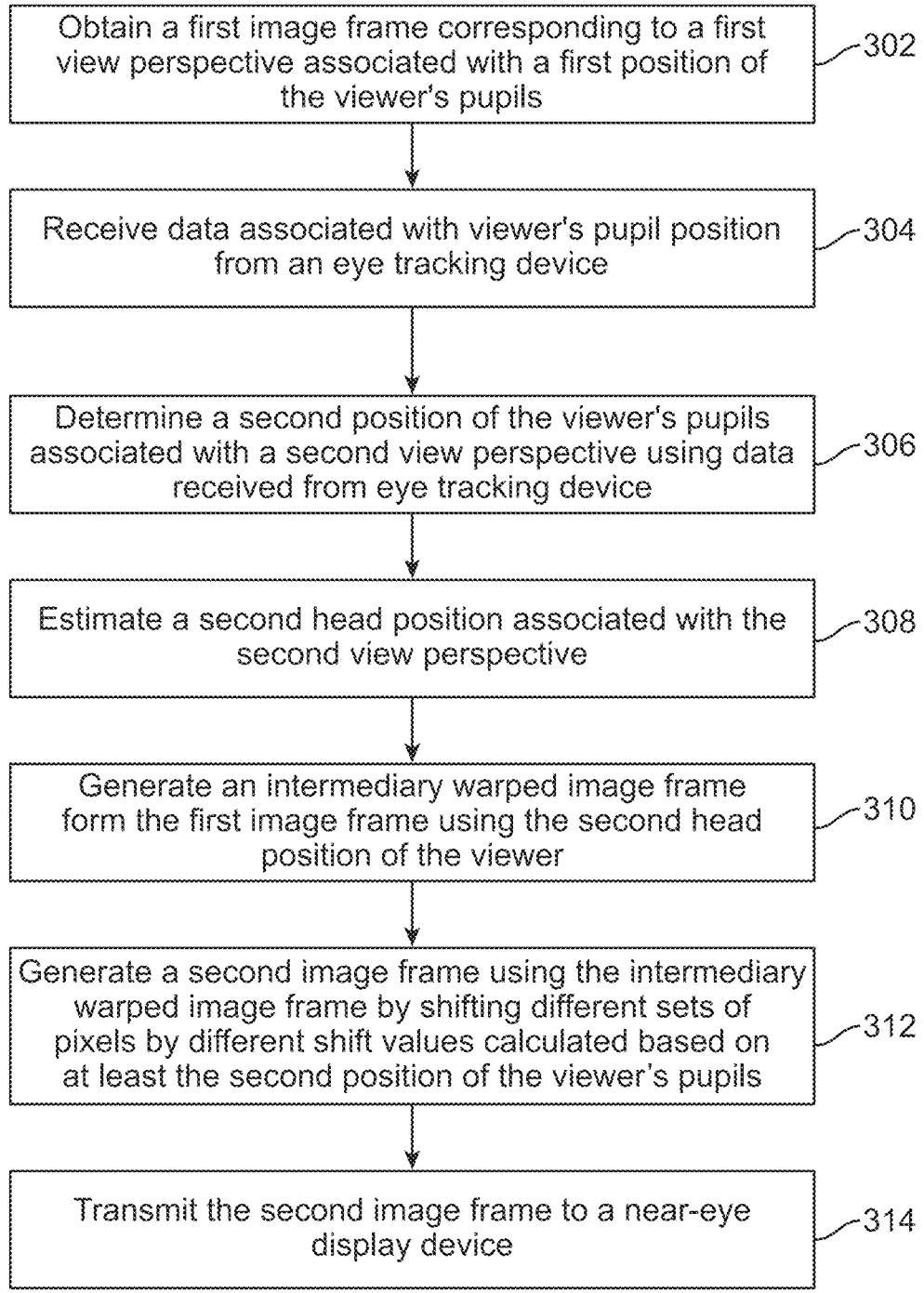
FIG. 3 illustrates an exemplary method for transforming an image frame based on a position of pupils of a user (e.g. a viewer), according to some embodiments.

FIG. 3 illustrates an exemplary method for transforming an image frame based on a position of pupils of a user (e.g. a viewer).

At step 302, the computing device obtains a first image frame corresponding to a first view perspective associated with a first position of the pupils of the viewer. According to various embodiments, the computing device may be coupled to a near-eye display device including a laser beam scanning display that displays data on pixels of the near-eye display device according to a predetermined scanning pattern. The data is displayed on a first set of pixels of the near-eye display device at a different moment in time than on a second set of pixels of the near-eye display device.

At step 304, the computing device may receive data associated with the viewer's pupil position from an eye tracking device coupled to the headset that the viewer is wearing.

At step 306, the computing device may determine a second position of the pupils of the viewer based on the data received from the eye tracking device. The second position of the viewer's pupils is associated with the second view perspective. In some embodiments, the position of the viewer's pupils may be determined with respect to a head position of the viewer. In other embodiments, the position of the viewer's pupils may be determined with respect to the headset (e.g. with respect to the pixels of the display device of the headset).

At step 308, the computing device may estimate a second head position that is also associated with a second view perspective.

At step 310, the computing device may generate an intermediary warped image frame from the first image frame using the second head position of the viewer. Accordingly, the intermediary warped image is generated using head pose based warp.

At step 312, the computing device may generate, based on the first image frame (e.g. in some embodiments, using the intermediary warped image frame which is generated from the first image frame), a second image frame corresponding to the second view perspective associated with the second position of the pupils of the viewer. The second image frame may be generated by shifting different sets of pixels of the second image frame by different shift values determined based on the second position of the viewer's pupils. For example, a first set of pixels may be shifted by a first shift value, and a second set of pixels may be shifted by a second shift value. The first shift value and the second shift value may be calculated based on at least the second position of the viewer's pupils. For example the shift values may also be calculated based on an eye velocity of the user.

According to various embodiments, the computing device may calculate an eye velocity for the viewer as a function of the first position of the pupils, the second position of the pupils and a time elapsed for the pupils of the viewer to get from the first position to the second position. In some embodiments, the eye velocity is calculated with respect to the headset (e.g. with respect to the pixels of the display device of the headset). The computing device may then calculate the shift value based on the eye velocity such that a first set of pixels may be shifted by a first shift value and a second set of pixels may be shifted by a second shift value. The number of shift values may depend on the scan pattern of the MR system. For example, if the MR system scans per row, it is possible to calculate as many shift values as the number of rows of the display device.

According to various embodiments, the MR system may choose the set of pixels according to a scan pattern. For example, the set of pixels may correspond to a predetermined number of rows of the display device. In some embodiments, the first set of pixels may correspond to the first row of pixels, and the second set of pixels may correspond to the second row of pixels. Since all pixels of the laser beam scanning display device is not activated at the same time, the displayed image frame exhibits visual artefacts such as separation of a top portion and a bottom portion of an exemplary displayed object. In other embodiments, the MR system may display the odd numbered rows first one-by-one, and then may display the even numbered rows one-by-one after the odd numbered rows are completed. The entire display operation may be completed in 16 milliseconds for the MR system to display one image frame. One of ordinary skill in the art will appreciate that the scan patterns discussed herein are for illustrative purposes, and the MR system can use any scan pattern to display an image frame on the display device.

At step 314, the computing device may transmit the second image frame to a near-eye display device to be displayed on the near-eye display device. The displayed image frame is free of visual artefacts such as slew and misstitch.

The following description provides five exemplary scenarios where the eye tracking data may be used to correct visual artefacts/anomalies/glitches resulting from the user of the MR device shifting their gaze (e.g. position of their pupils). The gaze shift may be in addition to a head pose change or may be by itself (e.g. user changes their gaze without moving their head). According to various embodiments, an eye tracking based shift may performed as a stand-alone correction or may be performed in addition to a head pose based warp (e.g. the eye tracking based shift may be performed on the head pose based warped image).

Figure 4:
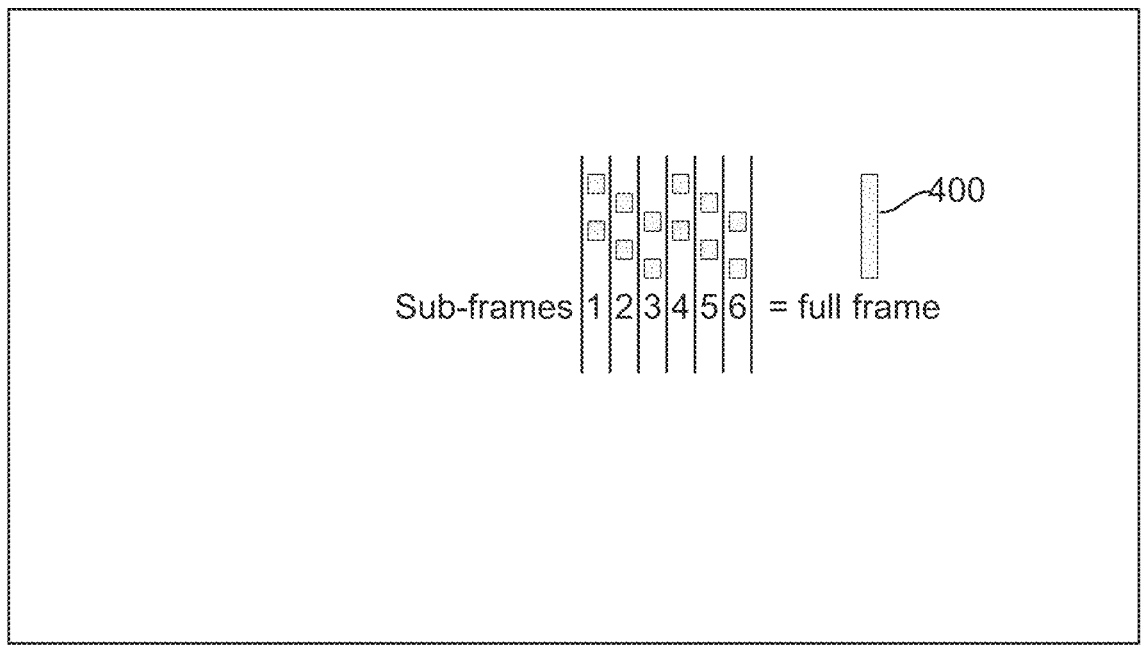
FIG. 4 illustrates an exemplary manner to split an image frame for purposes of visualization of VR scenarios illustrated in the next set of figures, according to various embodiments.

FIG. 4 illustrates an exemplary manner to split an image frame for purposes of visualization of VR scenarios illustrated in the next set of figures, according to various embodiments. For purposes of visualization, each 60 Hz frame may be split into 6 sub-frames. There is a small overlap between the top and bottom halves of the image. Rendering occurs at 60 Hz, but each section of the display device is flashed twice per rendered frame. The virtual object 400 should look like a vertical bar, but sometimes this is not what the user sees due to the visual artefacts as discussed below in connection with each scenario.

Exemplary Scenario One

In the first exemplary VR scenario, a virtual object (e.g. a virtual fairy) appears in the peripheral field of view of the user. The user looks at the virtual object, and fixes their gaze on the virtual object while the user turns their head/neck to face the virtual object. While the user rotates their head, the virtual object remains stationary, and the user's gaze is fixed on the virtual object.

Figure 5:
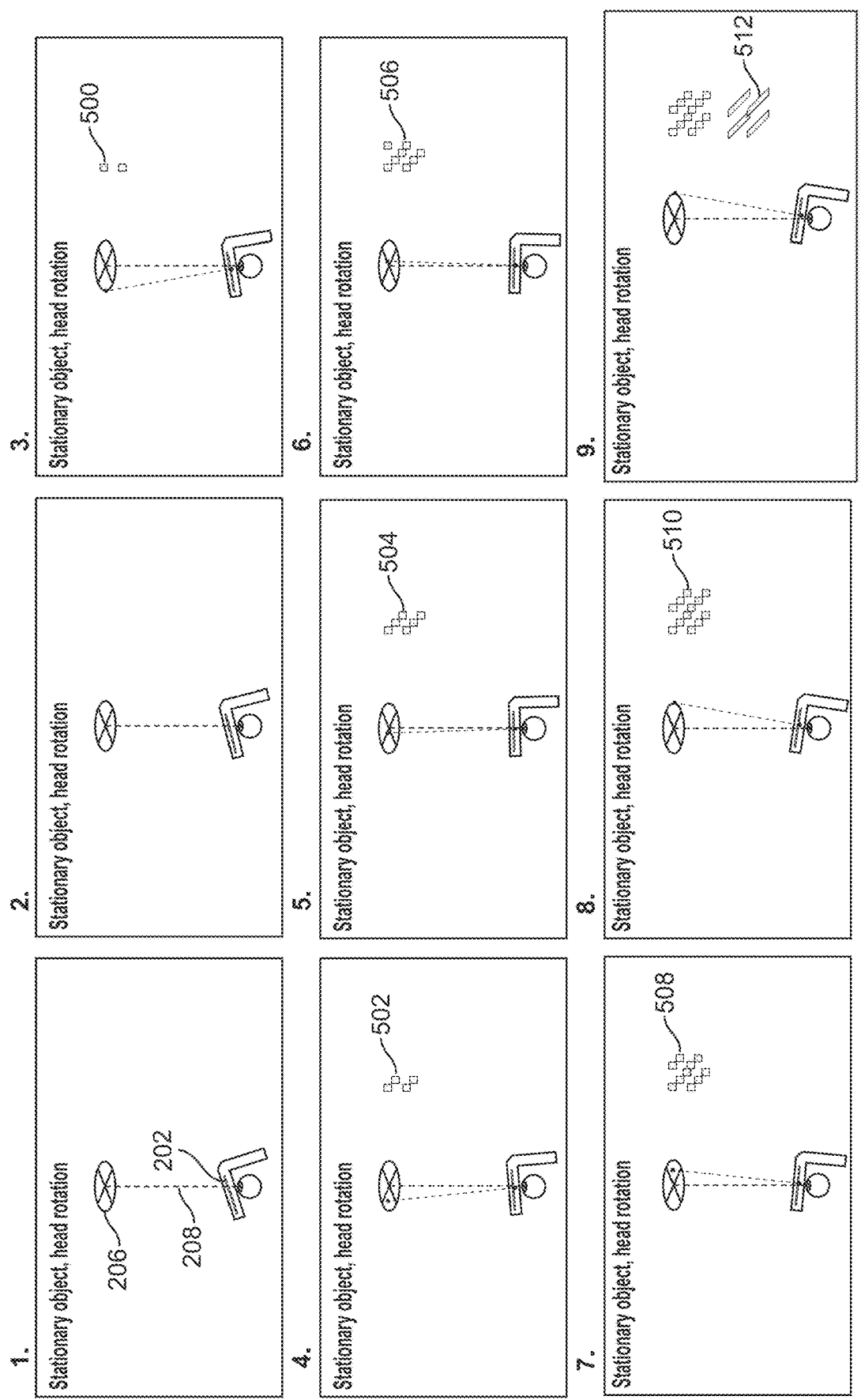
FIG. 5 illustrates a series of drawings associated with a first exemplary VR scenario without any visual correction being applied on the rendered image.

FIG. 5 illustrates a series of drawings (drawings 1-9) illustrating the clockwise head movement with respect to the virtual object, along with the rendered image displayed on the display device at an exemplary rate of 60 fps. No visual correction (e.g. head pose based warp or eye tracking based correction) is applied in the drawings shown in FIG. 5.

As the headset 200 as well as the display device 202 moves clockwise with respect to the user's pupils, the user's line of sight 208 remains fixed on the virtual object 206. At the third drawing, the first set of pixels 500 are displayed on a predetermined location (e.g. pixel) on the display device 202. When the user continues to move their head without shifting their gaze, the next set of pixels 502, 504, 506, 508, 510 (based on the scanning pattern of the MR system) are displayed on the display device as shown in drawings 4-8, respectively. As shown in these drawings, the pixels are formed outside the line of sight of the user which is fixed to the middle of the circle representing the virtual object on the drawings. Rather, the pixels are formed on a normal to the display device 202 as opposed to the line of sight of the user 208. As a result, the image of the object 512 displayed on the display device 202 appears slanted (e.g. slew artefact) and is split at the seam (e.g. misstitch artefact). The angle of the slew and the offset of the misstitch may be proportional to the angular speed of the headset. The final drawing (i.e. drawing 9) illustrates the final rendering of the image frame in continuous-time simulation on the display device. While the average position is correct, the object 512 (illustrated in continuous time simulation) looks slanted (slew) and is split at the seam (misstitch) when compared to the virtual object 400 illustrated in FIG. 4. The angle of the slew and the offset of the misstitch are proportional to the angular speed of the head rotation. This rendering is unacceptable in an MR system.

A conventional fix to the problem may warp the image frame based on the estimated head pose of the user. The MR system can detect and/or predict (e.g., using inertial measurement units) the head pose. The MR system can then warp or transform the rendered virtual content from the source frame of reference into warped virtual content in the output frame of reference.

Figure 6:
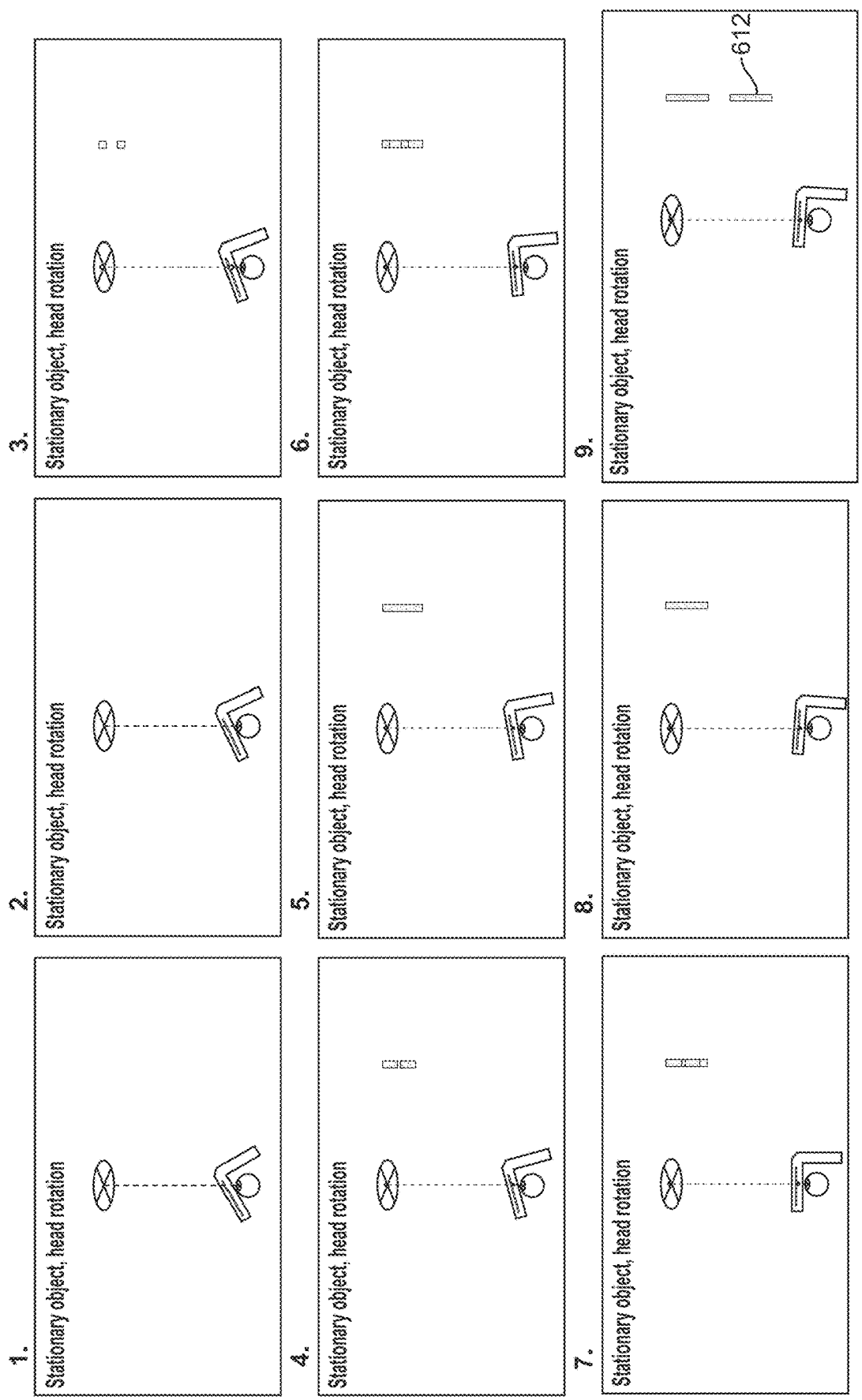
FIG. 6 illustrates a series of drawings associated with the first exemplary VR scenario with conventional head pose based correction being applied to the rendered image.

The head pose based solution to the first scenario is illustrated in FIG. 6. The MR system may know the head pose at the first drawing, and then extrapolate the head pose to estimate where the head will be at different points in time (as illustrated in subsequent drawings 2-8). Drawings 1-9 includes per-row warping of the image. For this scenario, a head pose estimation with 3 degrees-of-freedom may be enough to correct the visual artefacts. Once the head pose is extrapolated, the system may then warp the rendered image based on the estimated head pose. The head pose based warp is able to place the pixels on the line of sight of the user (e.g. all pixels are formed on the line of sight 208 of the user illustrated with the normal line to the pupil), thereby eliminates the visual artefacts. The final drawing (i.e. drawing 9) illustrates the final rendering of the image frame in continuous-time simulation on the display device. The object 612 (illustrated in continuous time simulation) looks identical to the virtual object 400 illustrated in FIG. 4. Even with the head pose based warp, the slew and misstitch may occur but are proportional to errors in the estimated head pose, as opposed to being proportional to the angular speed of the headset. That is, the virtual object would look accurate if the headpose is accurate.

Figure 7:
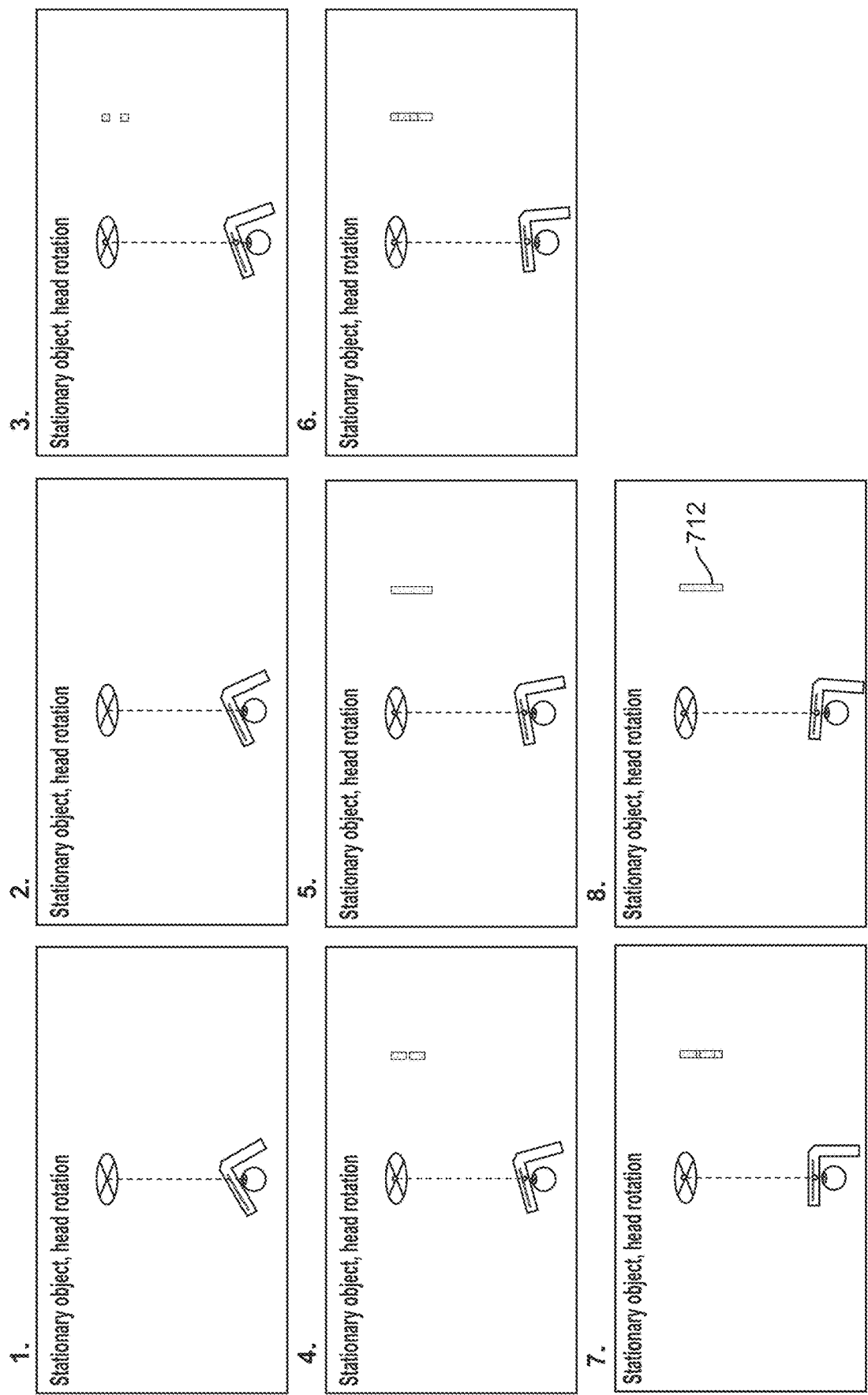
FIG. 7 illustrates a series of drawings associated with the first exemplary VR scenario with eye tracking based shifting being applied to the rendered image, according to some embodiments.

FIG. 7 illustrates a series of drawings (e.g. drawings 1-8) illustrating the eye tracking based solution (as opposed to headpose, depth plane or pixel motion tracking) to the first scenario according to various embodiments. The position of the pupils of the user may be tracked using a high-sample-rate, robust, high-accuracy eye tracking device coupled to the MR system. The eye tracking device may determine the position of the user's pupils at different points in time where a set of pixels (e.g. row) will be displayed on the display device. Accordingly, the eye tracking based solution "locks" or "sticks" elements of the virtual object to user's pupils or retinae instead of making them stick to the real world (as is done in conventional warping techniques and/or systems). The system may then calculate an eye velocity (e.g. velocity of the user's pupils with respect to the headset or display device worn by the user) in x and y pixels each time the system will shift the sets of pixels of the virtual object relative to the rendered frame (as illustrated in subsequent drawings 2-7). The final drawing (i.e. drawing 8) illustrates the final rendering of the image frame in continuous-time simulation on the display device. The object 712 looks identical to the virtual object 400 illustrated in FIG. 4.

According to various embodiments, the eye velocity may be calculated as a function of the first position of the user's pupils (e.g. as illustrated in drawing 2), the second position of the user's pupils (e.g. as illustrated in drawing 3) and a time elapsed for the pupils of the user to get from the first position to the second position (e.g. from the position in drawing 2 to the position in drawing 3 of FIG. 7). The eye velocity is calculated with respect to the headset. It may be desirable to calculate the eye velocity as late as possible for increased accuracy. For example, the first eye velocity may be calculated right before the first set of pixels are shifted by the first shift value, leaving just enough time for the system to calculate the first shift value using the first eye velocity.

In some embodiments, a different eye velocity may be used for each set of pixels (e.g. each row) to be shifted. A first eye velocity may be calculated for a first set of pixels, and a second eye velocity may be calculated for a second set of pixels. For MR devices that render at 60 Hz, the eye tracking based shifting may be performed at 360 Hz.

In some embodiments, the eye velocity may be zero. For example, the user may not change their gaze, and merely change their focus (e.g. looking from a faraway object to a closer object, where both objects are on the same line of sight). In such embodiments, the rendered image may still be warped or shifted however since the eye velocity would be zero, the shift value will be calculated as zero (e.g. no shift applied to the rendered image).

Exemplary Scenario Two

In the second exemplary VR scenario, a virtual object (e.g. a virtual gnome) appears on a real world object (e.g. a desk) in front of the user. The user tries to look around the gnome by swaying their body side to side so that the user can see what is behind the gnome. In such a scenario, the user's head undergoes translation without a rotation. While the user's body and head moves side to side, the user's gaze remains on the gnome.

Figure 8:
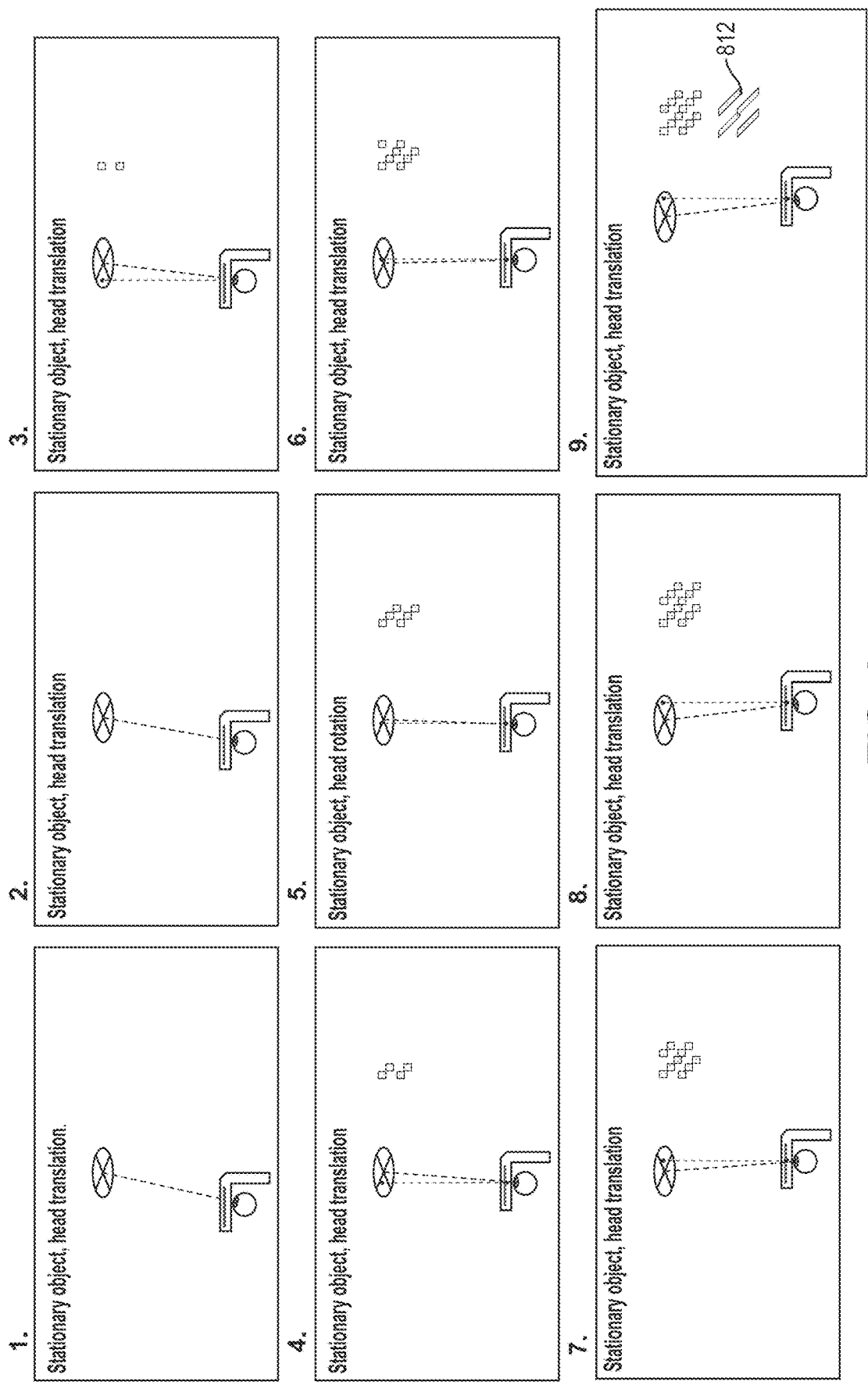
FIG. 8 illustrates a series of drawings associated with a second exemplary VR scenario without any visual correction being applied on the rendered image.

FIG. 8 illustrates a series of drawings (e.g. drawings 1-9) illustrating the head movement, along with the rendered image on the display device using a head pose based warp to shift the rendered image, where only the orientation of the head and not the translation is used. There is no rotation in this exemplary scenario. As the headset 200 as well as the display device 202 moves left-to-right with respect to the virtual object 206, the user's line of sight 208 remains fixed on the virtual object 206. At the third drawing, the first set of pixels are formed on a predetermined location (e.g. pixel) on the display device 202. When the user continues to move their head without shifting their gaze, the next set of pixels (based on the scanning pattern of the MR system) are displayed on the display device as shown in drawings 4-8, respectively. As shown in these drawings, the pixels are formed outside the line of sight of the user which is fixed to the middle of the circle representing the virtual object on the drawings. Rather, the pixels are formed on a normal to the display device 202 as opposed to the line of sight of the user 208. The drawing 9 illustrates the final rendering of the virtual object on the display device. As shown, the displayed image 812 (illustrated in continuous-time simulation) includes motion artifacts such as slew and misstitch due to using 3 degrees-of-freedom head pose (e.g. orientation only). If the system tries to correct the artefacts using a head pose based warp which tracks orientation and not translation, the correction will not be enough. The system would need the head pose in 6 degrees-of-freedom (which tracks both orientation and translation), as well as the object depth plane (or the vergence depth to determine the plane).

Figure 9:
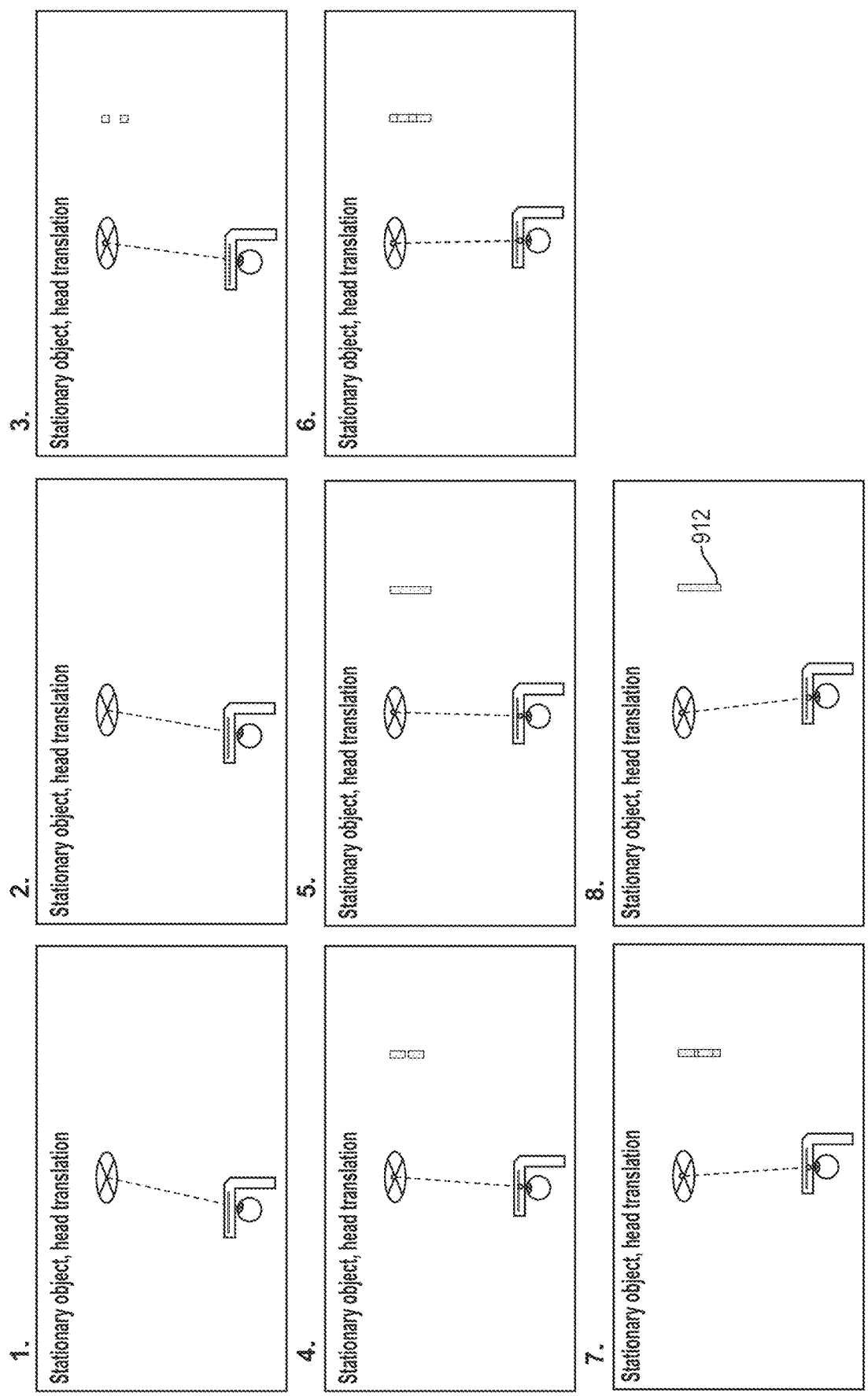
FIG. 9 illustrates a series of drawings associated with the second exemplary VR scenario with eye tracking based shifting being applied to the rendered image, according to some embodiments.

FIG. 9 illustrates a series of drawings (e.g. drawings 1-8) illustrating the eye tracking based solution to the second scenario according to various embodiments. The position of the pupils of the user may be tracked using a high-sample-rate, robust, high-accuracy eye tracking device coupled to the MR system. The eye tracking device may determine the position of the user's pupils at different points in time where a set of pixels (e.g. row) will be displayed on the display device. Accordingly, the eye tracking based solution "locks" or "sticks" elements of the virtual object to user's pupils or retinae instead of making them stick to the real world (as is done in conventional warping techniques and/or systems). The system may then calculate an eye velocity (e.g. velocity of the user's pupils with respect to the headset or display device worn by the user) in x and y pixels for each unit of the scan pattern (e.g. each row) to shift the sets of pixels (e.g. rows) relative to the rendered frame. The final drawing (i.e. drawing 8) illustrates the final rendering of the image frame in continuous-time simulation on the display device. The object 912 looks identical to the virtual object 400 illustrated in FIG. 4. As illustrated in the drawings of FIG. 9, the pixels all appear on the line of sight of the user, eliminating the visual artefacts on the displayed image frame (as illustrated in drawing 8 of FIG. 9).

Exemplary Scenario Three

In the third exemplary VR scenario, a virtual object (e.g. a virtual mouse) appears behind a real world object (e.g. a coffee cup) in front of the user. For example, the mouse pokes his head out from behind the coffee cup. The mouse runs over from the coffee cup to another object in the scene. The user follows the mouse with their gaze without moving. In such a scenario, the virtual object moves, but the user's head is stationary. The user's gaze remains on the moving virtual object.

Figure 10:
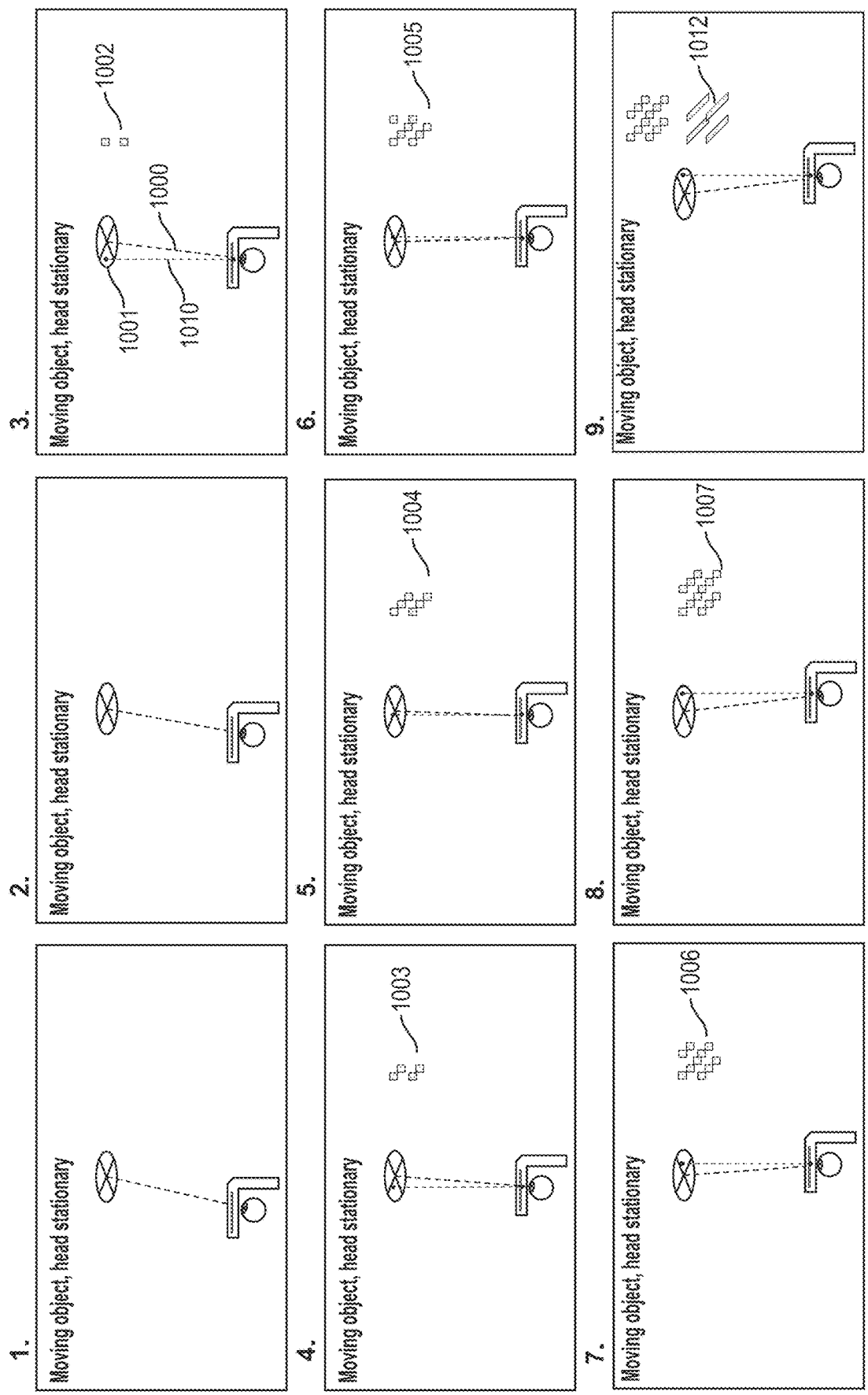
FIG. 10 illustrates a series of drawings associated with a third exemplary VR scenario without any visual correction being applied on the rendered image.

FIG. 10 illustrates a series of drawings (e.g. drawings 1-9) illustrating the movement of the virtual object, along with the rendered image rendered on the display device. As the virtual object 206 moves right-to-left with respect to the headset 200 as well as the display device 202 (as illustrated in drawings 3-8), the user's line of sight 208 remains fixed on the virtual object 206. At the third drawing, the first set of pixels 1002 are formed on a predetermined location (e.g. pixel) on the display device 202. When the virtual object continues to move with respect to the headset without the user shifting their gaze from the virtual object, the next set of pixels 1003, 1004, 1005, 1006, 1007 (based on the scanning pattern of the MR system) are displayed on the display device as shown in drawings 4-8, respectively. As shown in each of these drawings, each of the pixels 1003, 1004, 1005, 1006, 1007 are formed outside the line of sight 1000 of the user which is fixed to the middle of the circle 1001 representing the virtual object on the drawings. Rather, the pixels 1003, 1004, 1005, 1006, 1007 are formed on a normal 1010 to the display device 202 as opposed to the line of sight 1000 of the user 208. The drawing 9 illustrates the final rendering of the virtual object in continuous-time simulation on the display device. Since the user's head is not moving, conventional head pose based warping (even one with 6 degrees-of-freedom instead 3) will not be able to correct the slew and misstitch on the displayed image 1012 as shown in drawing 9 of FIG. 10. That is, since the head pose is the same, the head pose based warp applied will result in a shift of zero pixels for the image. The conventional approach to correcting for this is to use motion vectors for the virtual objects in addition to head pose to perform the warp. Even if 6 degrees-of-freedom head pose is used along with the correct depth plane, the rendered image will still have slew and misstitch.

Figure 11:
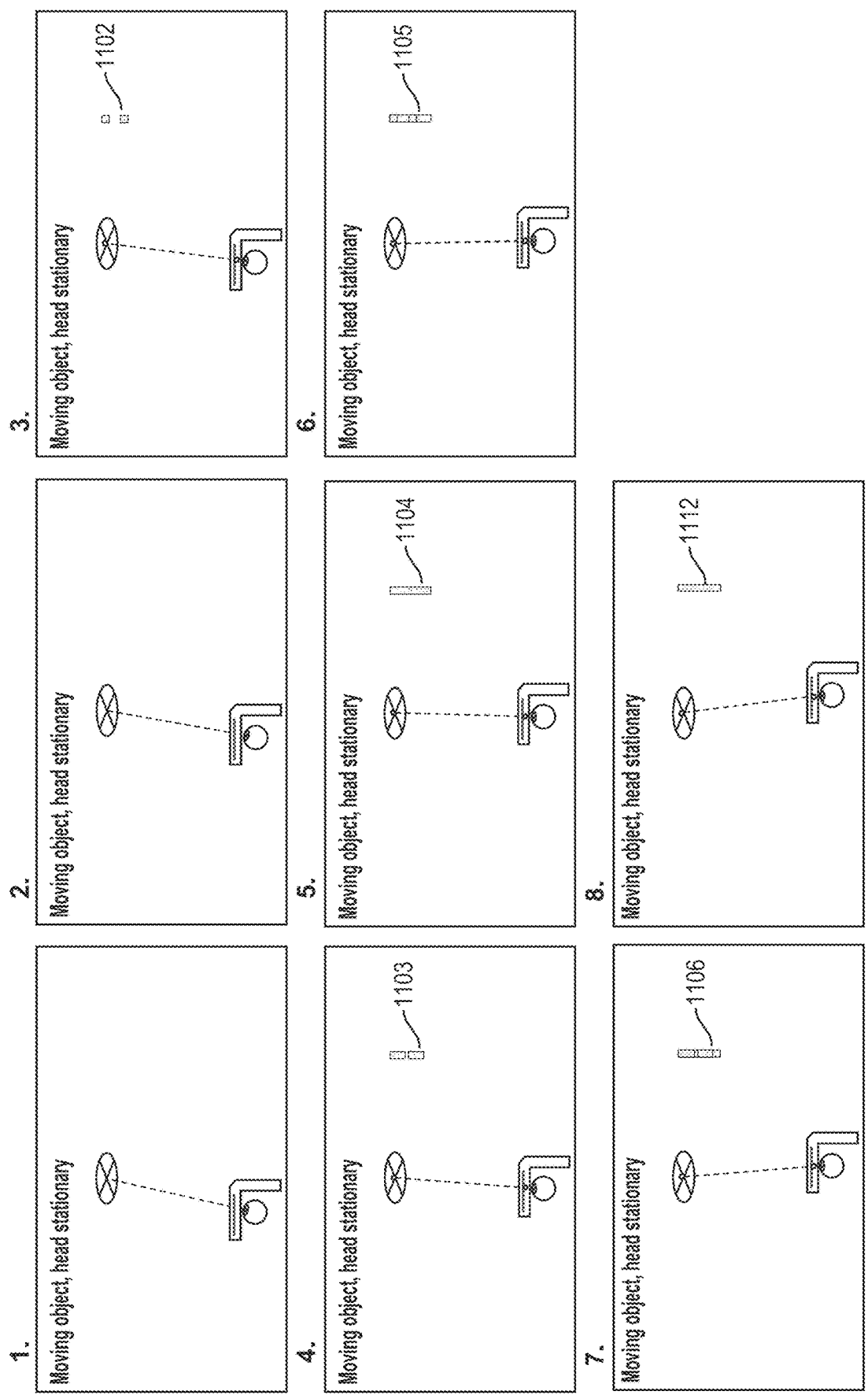
FIG. 11 illustrates a series of drawings associated with the third exemplary VR scenario with eye tracking based shifting being applied to the rendered image, according to some embodiments.

FIG. 11 illustrates a series of drawings (e.g. drawings 1-9) illustrating the eye tracking based solution to the third scenario according to various embodiments. The position of the pupils of the user may be tracked using a high-sample-rate, robust, high-accuracy eye tracking device coupled to the MR system. The eye tracking device may determine the position of the user's pupils at different points in time (e.g. as illustrated in drawings 3-8) where a set of pixels (e.g. row) 1102, 1103, 1104, 1105, 1106 will be displayed on the display device. Accordingly, the eye tracking based solution "locks" or "sticks" elements of the virtual object to user's pupils or retinae instead of making them stick to the real world (as is done in conventional warping techniques and/or systems). The system may then calculate an eye velocity (e.g. velocity of the user's pupils with respect to the headset or display device worn by the user) in x and y pixels for each unit of the scan pattern (e.g. each row) to shift the sets of pixels (e.g. rows) relative to the rendered frame. The final drawing (i.e. drawing 8) of FIG. 11 illustrates the final rendering of the image frame in continuous-time simulation on the display device. The object 1112 looks identical to the virtual object 400 illustrated in FIG. 4. As illustrated in the drawings of FIG. 11, the pixels all appear on the line of sight of the user, eliminating the visual artefacts on the displayed image frame (as illustrated in drawing 8 of FIG. 11).

Exemplary Scenario Four

The third scenario exemplifies how rendering and image display gets complicated when the virtual object is in motion. The head pose based warping is not enough to correct the slew and the misstitch on the displayed image. The next scenario illustrates that in certain cases, the head pose based warping not only is not enough to correct the artefacts, but also makes the quality of the displayed image worse.

In the fourth exemplary VR scenario, a virtual object (e.g. a virtual fish) moves around the user. The user turns their whole body to follow the virtual object. Both the headset and the user's pupils are rotating relative to the real world, but are fixed relative to each other.

Figure 12:
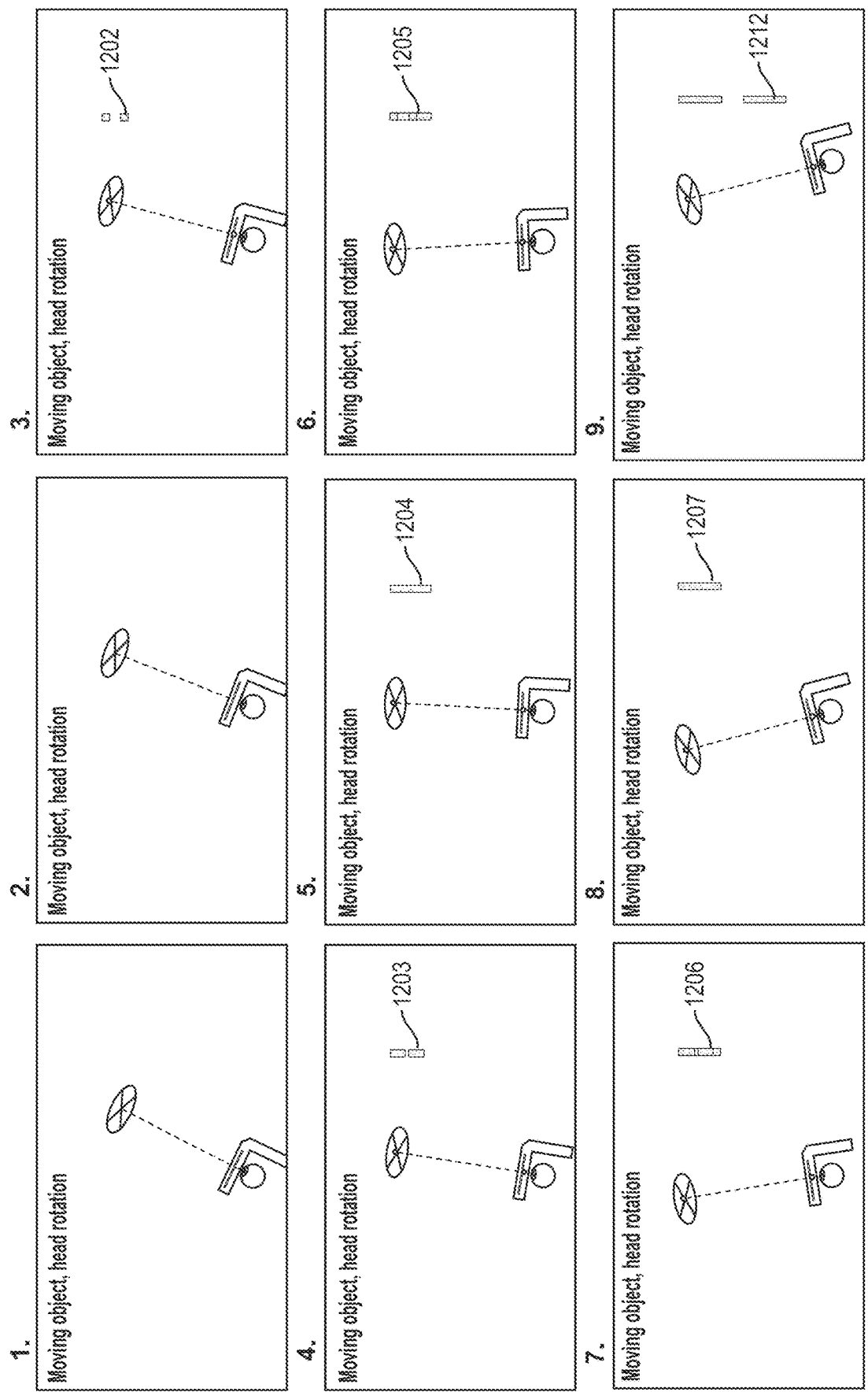
FIG. 12 illustrates a series of drawings associated with a fourth exemplary VR scenario without any visual correction being applied on the rendered image.

FIG. 12 illustrates a series of drawings (drawings 1-8) illustrating the headset and pupil movement while remaining fixed relative to each other, along with the rendered image rendered on the display device. Head pose warp is not applied in the drawings illustrated in FIG. 12. Referring to reference numerals illustrated in FIG. 2, as the headset 200 (including the display device 202) as well as the user's gaze illustrated in FIG. 12 move counter-clockwise along with the virtual object 206, the user's line of sight 208, as well as the normal vector to the display device 202 remain fixed on the virtual object 206. At the third drawing, the first set of pixels 1202 are formed on a predetermined location (e.g. pixel) on the display device 202. When the user continues to move their head without shifting their gaze, the next set of pixels 1203, 1204, 1205, 1206, 1207 (based on the scanning pattern of the MR system) are displayed on the display device as shown in drawings 4-8, respectively. As shown in these drawings, the pixels are formed outside the line of sight of the user which is fixed to the middle of the circle representing the virtual object on the drawings. Rather, the pixels are formed on a normal to the display device 202 as opposed to the line of sight of the user 208. The drawing 9 of FIG. 12 illustrates the final rendering of the virtual object in continuous-time simulation on the display device. The object 1212 looks identical to the virtual object 400 illustrated in FIG. 4. Since the user is following the moving object with their eyes and their head, the resulting image is sharp, without any slew or misstitch. This result is obtained without applying head pose based warp.

On the other hand, for an MR system which is applying a head pose based warp for each rendered image frame, the exemplary scenario four (a virtual object moves around the user, the user turns their whole body to follow the virtual object, both the headset and the user's pupils are rotating relative to the real world, but are fixed relative to each other) results in a low quality image. That is, the head pose based warp lowers the quality of the displayed image by inserting slew and/or misstitch, as illustrated in FIG. 13.

Figure 13:
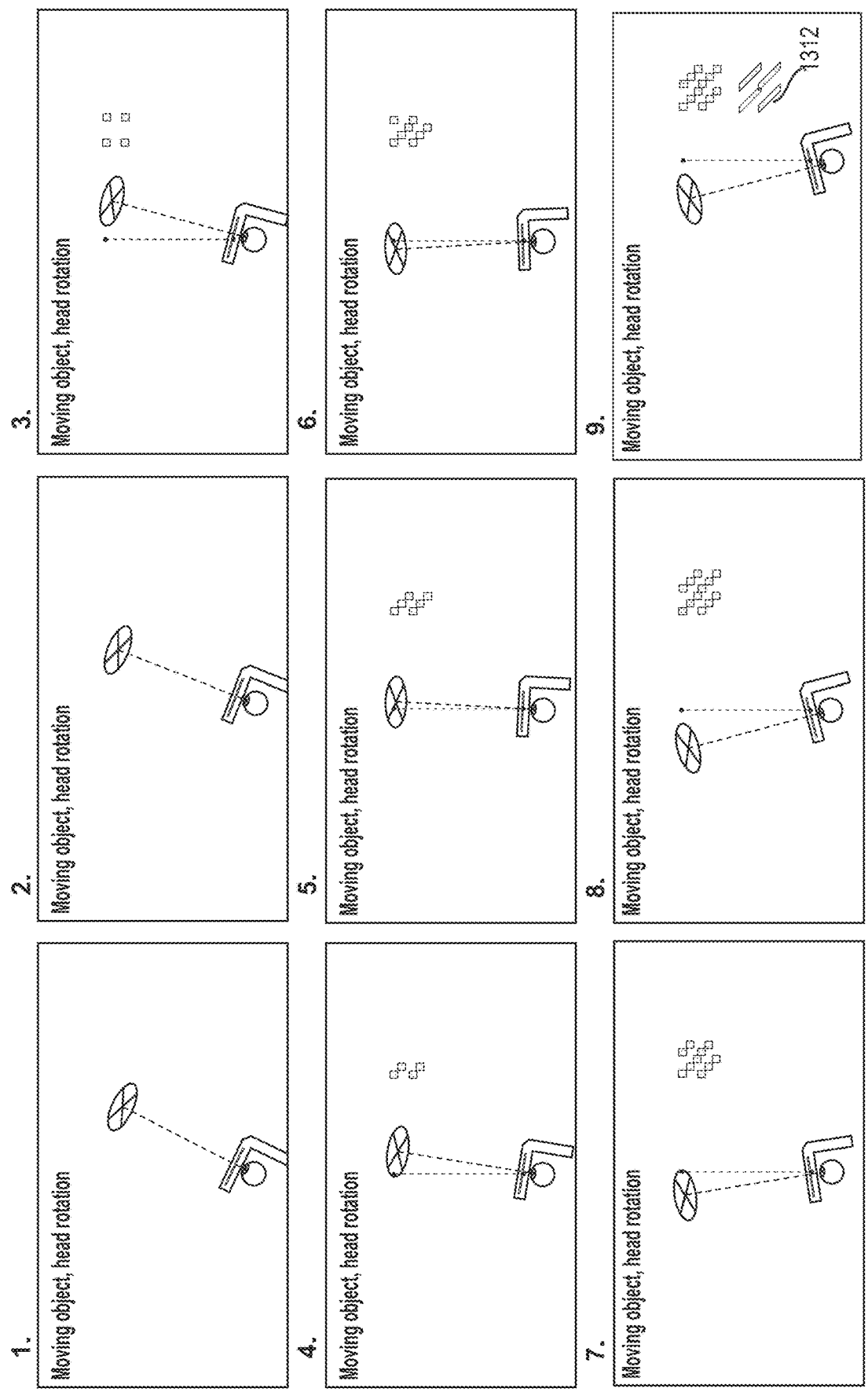
FIG. 13 illustrates a series of drawings associated with the fourth exemplary VR scenario with conventional head pose based correction being applied to the rendered image.

The MR system may know the head pose at the first drawing, and then extrapolate the head pose to estimate where the head will be at different points in time (as illustrated in drawings 3-8 of FIG. 13). Once the head pose is extrapolated, the system may then shift one or more sets of pixels (e.g., rows). The head pose based warp aims to place the pixels on the line of sight of the user, however does not account for the movement of the virtual object. Thus, the head pose based warp tries to lock the virtual object to the world and introduces slew and misstitch on the displayed image 1312, as illustrated in the drawing 9 of FIG. 13.

Figure 14:
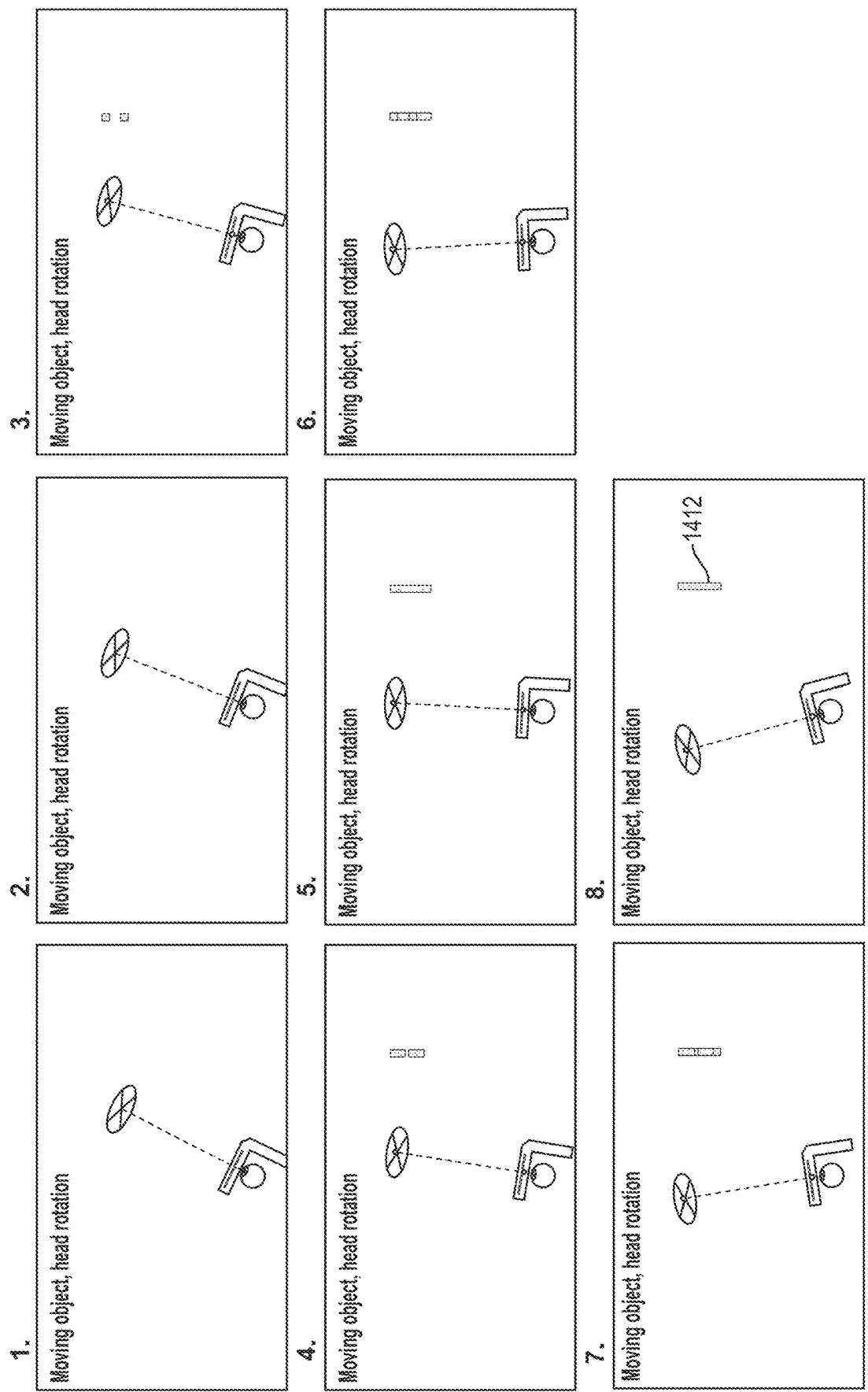
FIG. 14 illustrates a series of drawings associated with the fourth exemplary VR scenario with eye tracking based shifting being applied to the rendered image, according to some embodiments.

FIG. 14 illustrates a series of drawings (drawings 1-8) illustrating the eye tracking based solution to the fourth scenario according to various embodiments. Since the system calculates the eye velocity with respect to the headset, when the headset and the pupils are moving at the same time, the eye velocity is zero. Thus, the eye-velocity based shift value is zero. As illustrated in the drawings of FIG. 14, the pixels appear on the line of sight of the user, eliminating the visual artefacts on the displayed image frame. Thus, the result is the same as in FIG. 12, even when the eye tracking based solution is applied by default. The drawing 8 of FIG. 14 illustrates the final rendering of the virtual object in continuous-time simulation on the display device. The object 1412 looks identical to the virtual object 400 illustrated in FIG. 4.

Exemplary Scenario Five

In the fifth exemplary VR scenario, a virtual object (e.g. a virtual robot) is in the center of the user's field of view. However, the user is not looking at the virtual object. Instead, the user may be comparing two other virtual objects or areas next to the virtual object. For example, the user may be looking at an area 216 placed to the right of the virtual object and the area 226 placed to the left of the virtual object. That is, the user may be darting their eyes back and forth between the two areas, and across the virtual object while the virtual object and the user's head remain stationary. This eye movement may be referred as "saccading". This scenario is similar to the third exemplary VR scenario, except for the eyes moving at a faster velocity.

Figure 15:
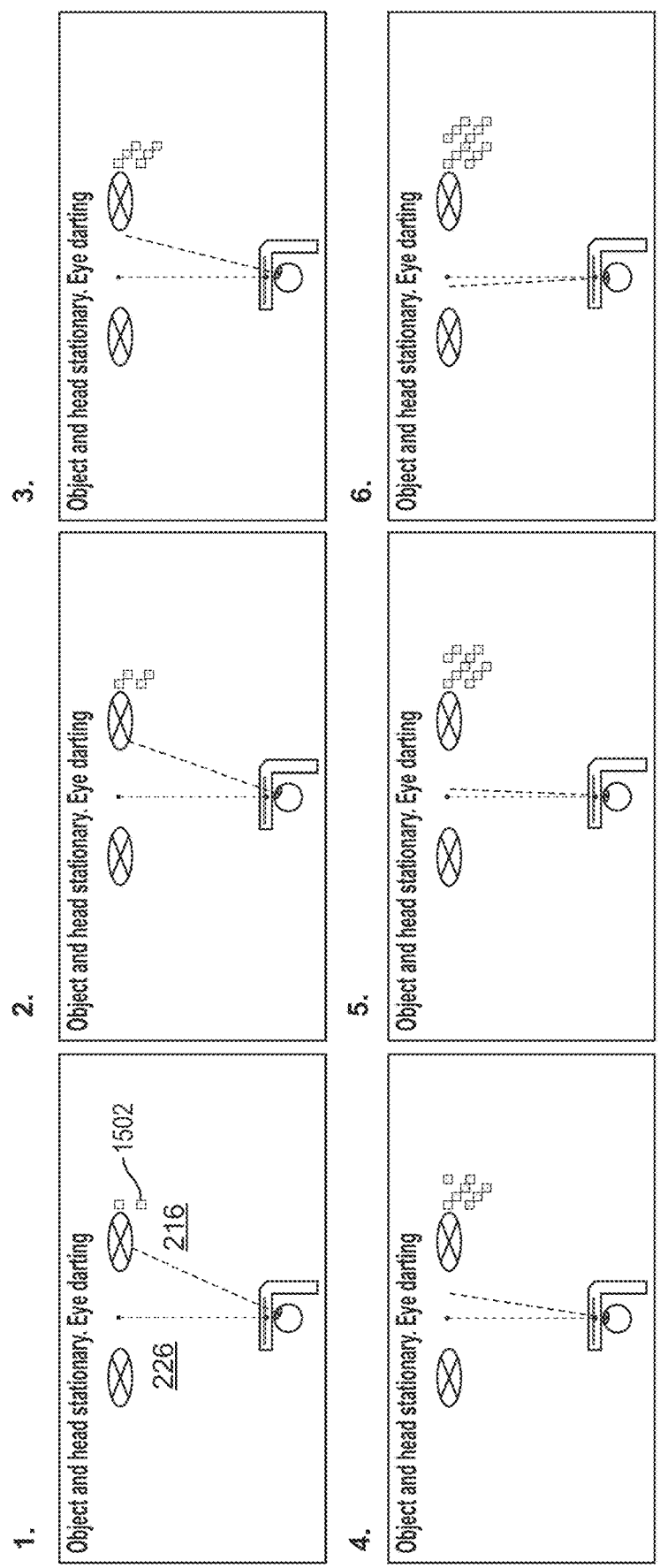
FIG. 15 illustrates a series of drawings associated with a fifth exemplary VR scenario without any visual correction being applied on the rendered image.
Figure 15:
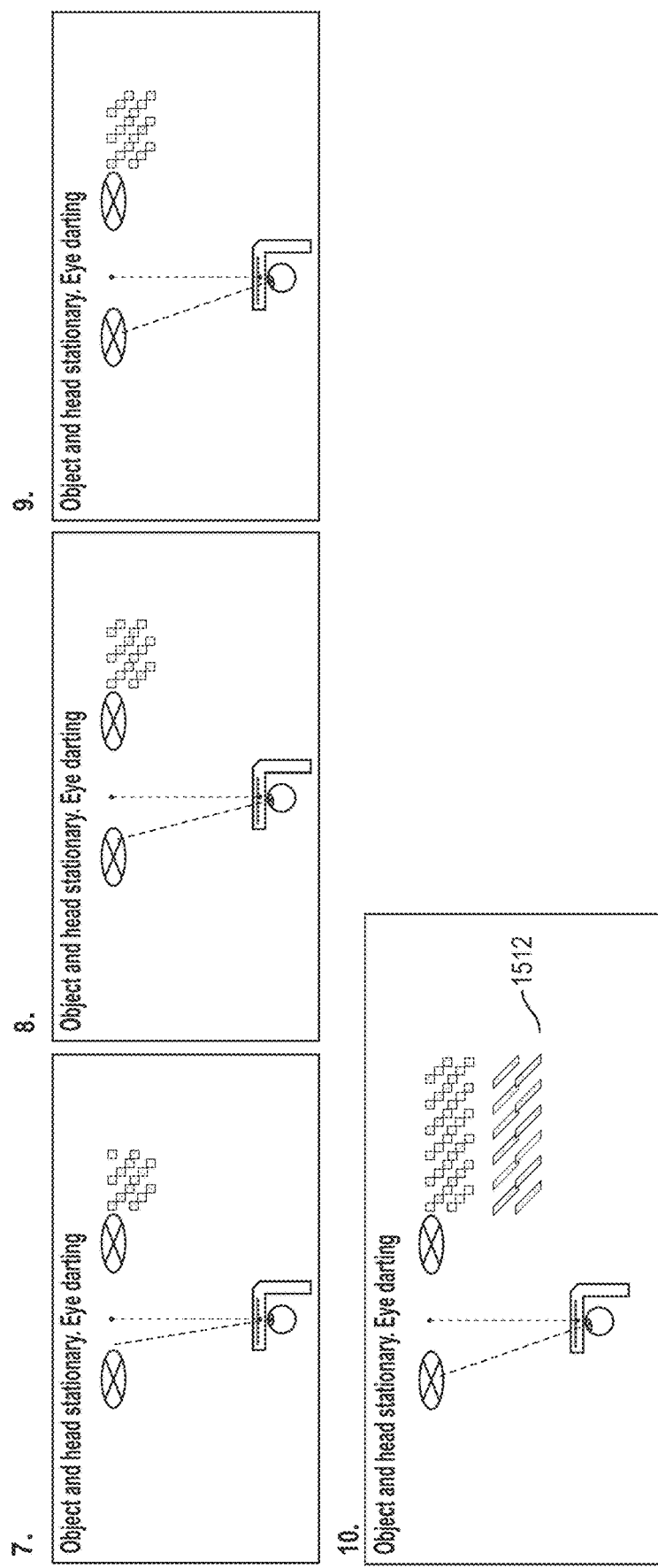

FIG. 15 illustrates a series of drawings illustrating the saccading eye movement, along with the rendered image rendered on the display device using a head pose based warp to the rendered image. As the headset 200 as well as the display device 202 remains static, the user moves their eyes from moves left-to-right with respect to the areas 216 and 226, the user's line of sight 208 moves between the two areas. At the first drawing, the first set of pixels 1502 are formed on a predetermined location (e.g. pixel) on the display device 202. When the user continues to move their eyes, the next set of pixels (based on the scanning pattern of the MR system) are displayed on the display device as shown in drawings 2-10, respectively. As shown in these drawings, the pixels are formed outside the line of sight of the user which is fixed to the middle of the circle representing the virtual object on the drawings. Rather, the pixels are formed on a normal to the display device 202 as opposed to the line of sight of the user 208. The last drawing (i.e. drawing 10 of FIG. 15) illustrates the final rendering of the virtual object in continuous-time simulation on the display device. As shown in drawing 9 of FIG. 15, the displayed image 1512 exhibits slew and misstitch.

In this scenario, the formed artefact is asynchronous and transient instead of synchronous and repeatable. A periodic artifact is seen. It never resets back to the same spot on the retina as with other scenarios. Since the user's head is not moving, conventional head pose based warping will not be able to correct the artefact on the displayed image (e.g. the head pose is the same, thus the warp applied based on head pose will be zero warp). In addition, the motion vector based warp (which could improve scenario three) may not be applied here since there are no real objects and no virtual objects that the user's eye is following.

Figure 16:
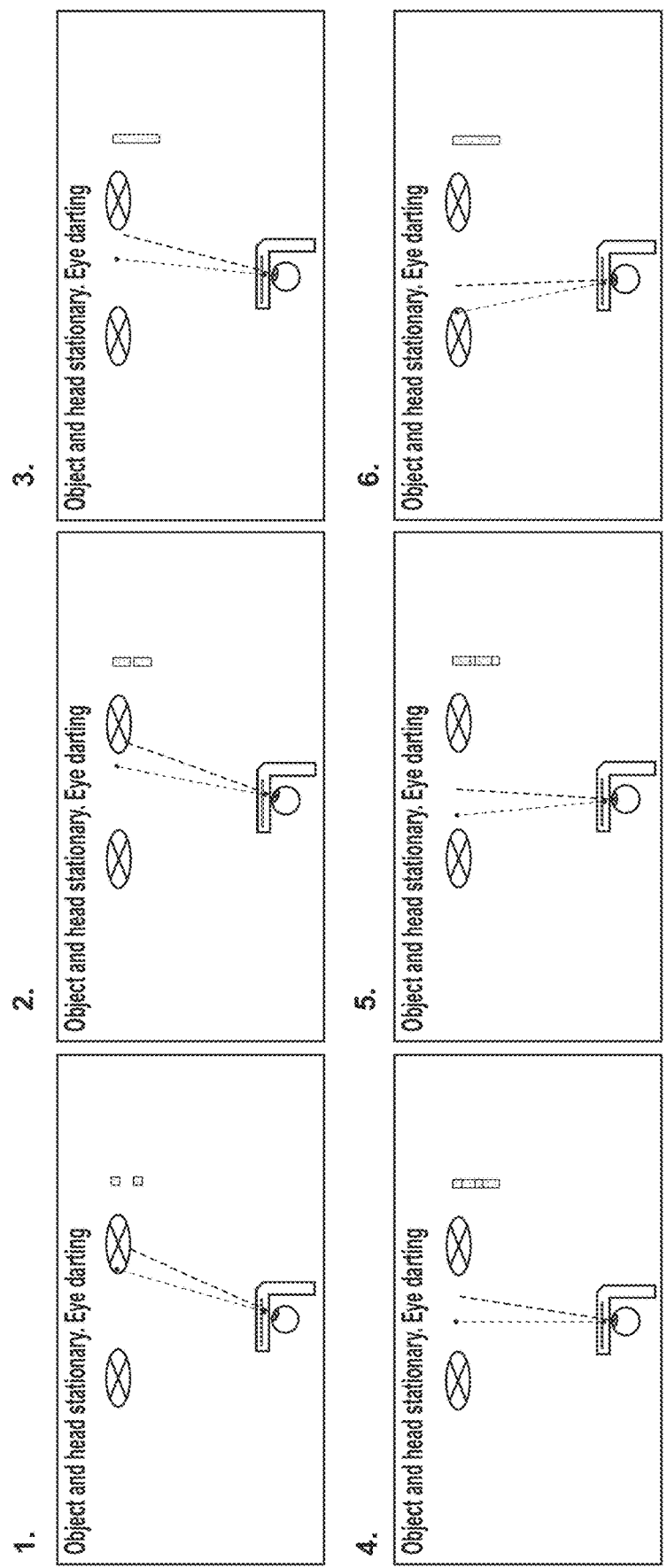
FIG. 16 illustrates a series of drawings associated with the fifth exemplary VR scenario with eye tracking based shifting being applied to the rendered image, according to some embodiments.
Figure 16:
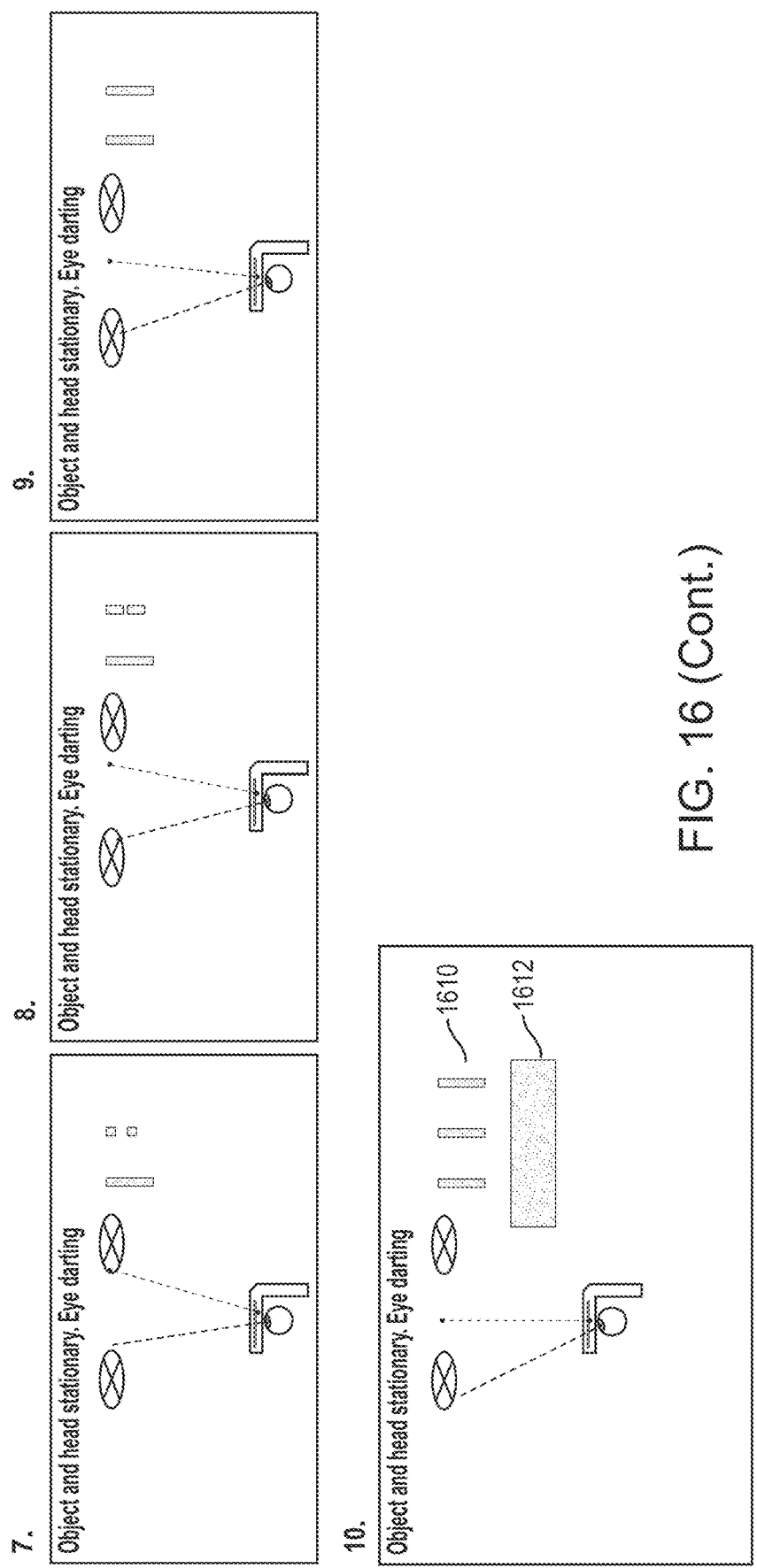

FIG. 16 illustrates the eye tracking based solution to the fifth scenario (e.g. saccading eyes between the two areas, and across the virtual object while the virtual object and the user's head remain stationary according to various embodiments). The position of the pupils of the user may be tracked using a high-sample-rate, robust, high-accuracy eye tracking device coupled to the MR system. The eye tracking device may determine the position of the user's pupils at different points in time where a set of pixels (e.g. row) will be displayed on the display device. Accordingly, the eye tracking based solution "locks" or "sticks" elements of the virtual objects to user's pupils or retinae instead of making them stick to the real world (as is done in conventional warping techniques and/or systems). The system may then calculate an eye velocity (e.g. velocity of the user's pupils with respect to the headset or display device worn by the user) in x and y pixels for each unit of the scan pattern (e.g. each row) to shift the sets of pixels (e.g. rows) relative to the rendered frame. As illustrated in drawing 10 of FIG. 16, multiple sharp copies of the virtual object 1610 are rendered, but each copy is undistorted (e.g. the slew and misstitch are eliminated but there is strobing). It may be desirable to add digital blur (e.g. using a horizontal box-car filter) to the rendered image for improved quality, as shown in rendered image 1612.

As the user darts their eye around, instead of seeing slew and misstitch, the user would see some strobing. Adding artificial blur would help this, but could be computationally prohibitive for full 2-dimensional blur functions.

In some embodiments, the eye tracking based shifting may be applicable to the two independent-monocles displays. Each eye's tracking may be used to warp the corresponding display. In some embodiments, eye tracking for one eye may be used for both eyes (e.g. when the device loses tracking in one eye).

According to various embodiments, a single late-frame time warp may be performed to fix a rendered image frame. Subsequently, an eye tracking based shift may be applied to the warped rendered image frame to shift different sets of pixels by different shift values. Thus, while the pixel shift based on the eye tracking may be performed as a stand-alone solution, the pixel shift based on the eye tracking may also be performed subsequent to head pose based warp on a rendered image frame. The pixel shift based on the eye tracking may be applied on the headset portion of the MR device.

Figure 17:
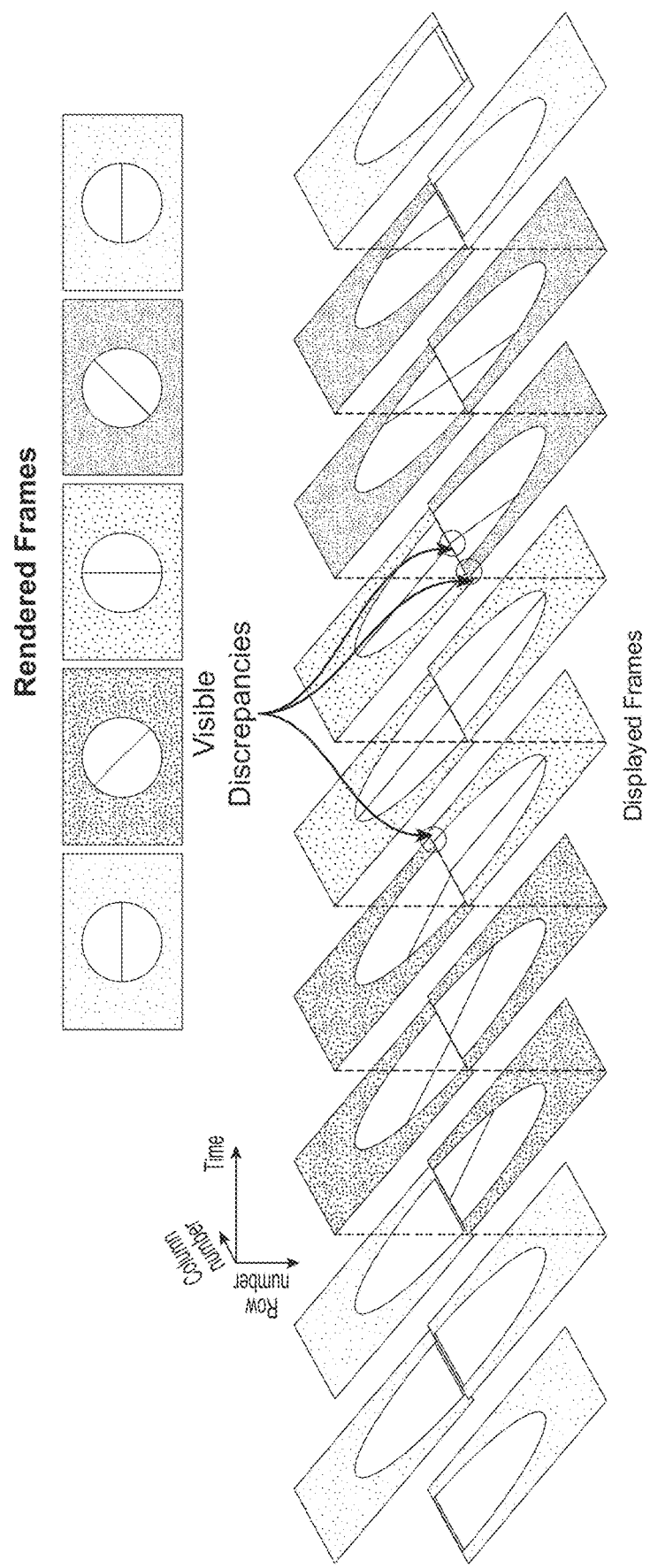
FIGS. 17-21 illustrate additional processing that may be used in connection with eye tracking based shifting to improve the quality of the displayed image frame, according to some embodiments.
Figure 18:
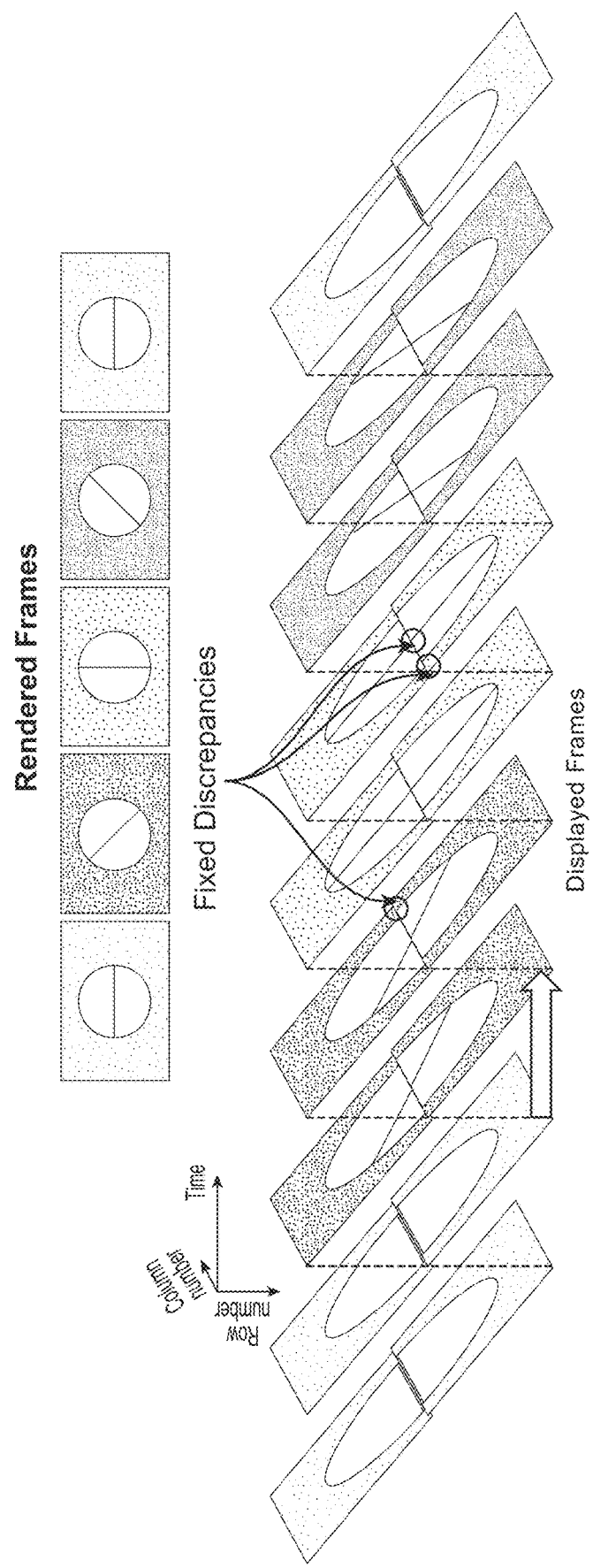
Figure 19:
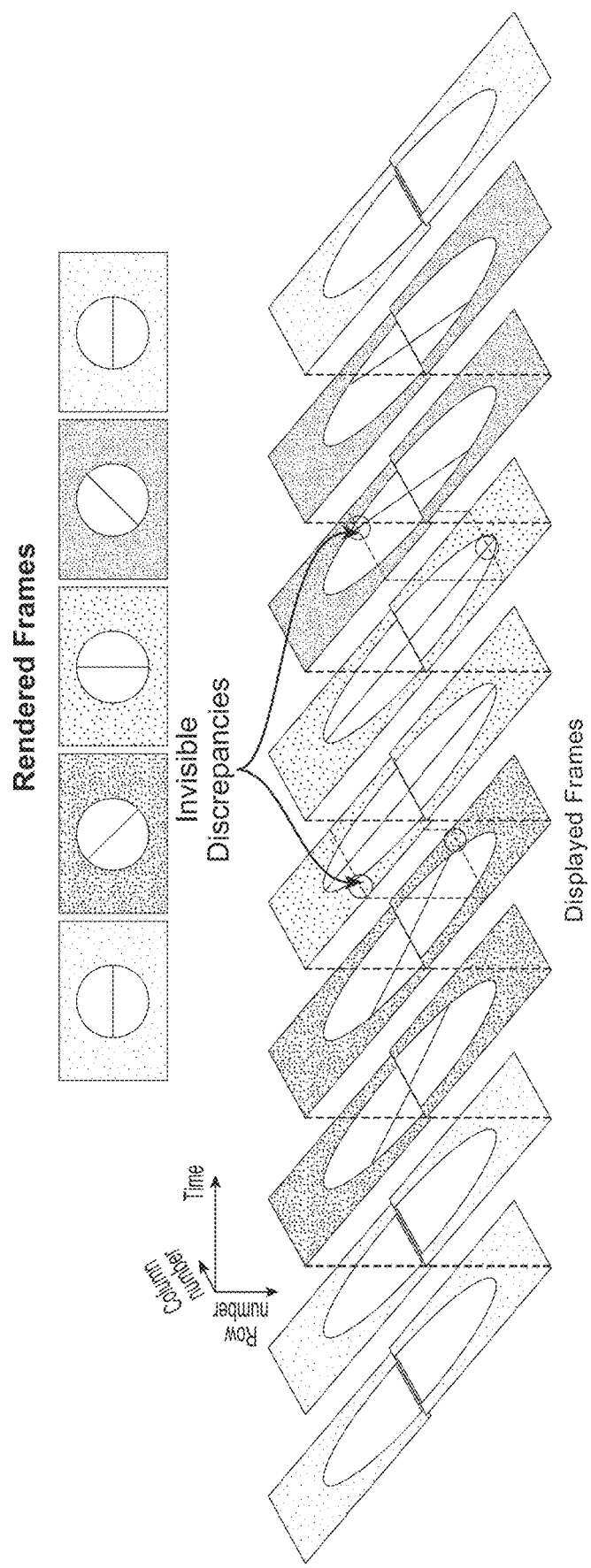

FIGS. 17-21 illustrate additional processing that may be used in connection with eye tracking based shifting to improve the quality of the displayed image frame. FIG. 17 illustrates the visual discrepancies that may be present on a rendered image. If the rendered image is displayed without further processing, when the user is looking at the seam, the fovea can see pixels from above the seam and below the seam at the same time. Accordingly, discrepancies at the seam are easily perceived, especially because they are temporally close. When the eye tracking based shifting is applied, as illustrated in FIG. 18, to delay the data sent to the bottom laser by one scan time, the discrepancies are fixed. Even though there are different colors and spoke angles being projected simultaneously as shown in FIG. 19, the fovea of the user cannot see both at the same time because they are spatially separated.

Figure 20:
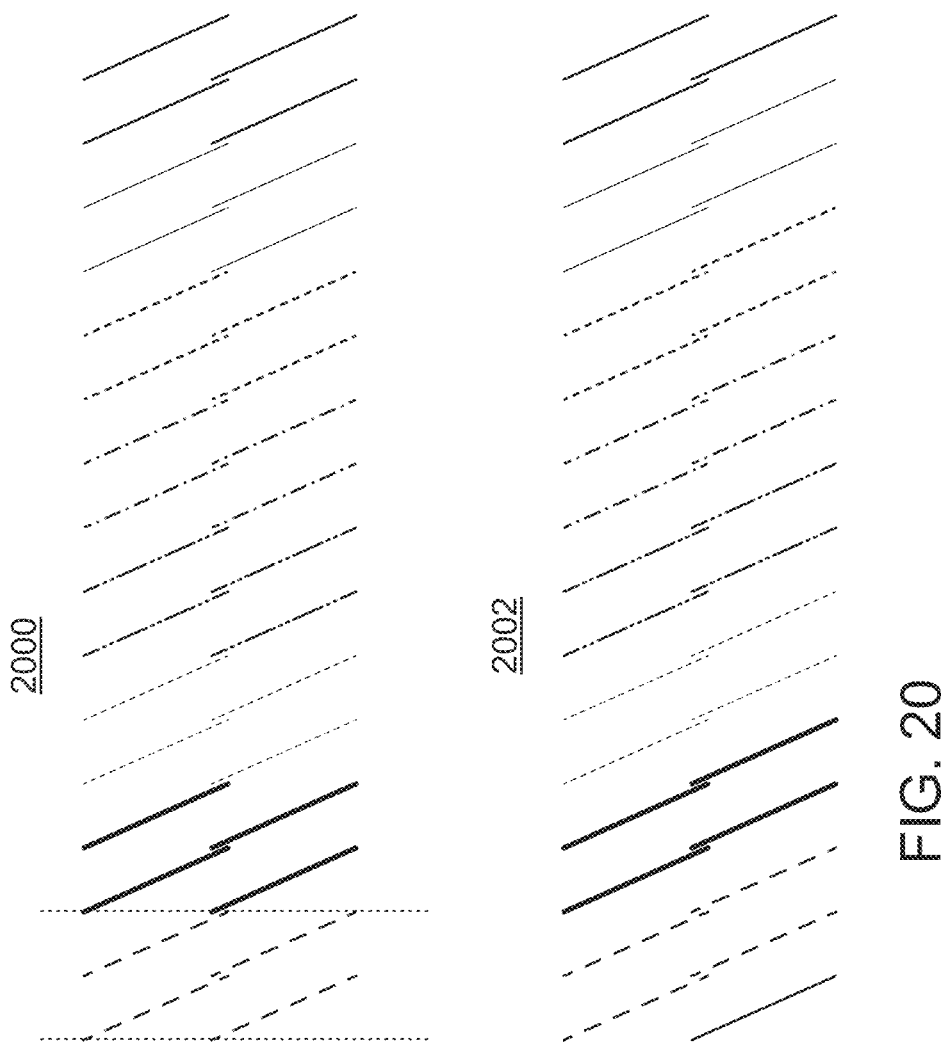

FIG. 20 illustrates another example of eye tracking based shifting with frame doubling. The rendering 2000 is improved by frame doubled rendering 2002. According to various embodiments, different rendered frames may be displayed simultaneously. For example, doubling the frame rate from 60 Hz to 120 Hz, may reduce misstitching by tenfold, result in less visible tearing, lower the motion-to-photon latency and require smaller frame buffer, as illustrated in the rendered frames 2002.

Figure 21:
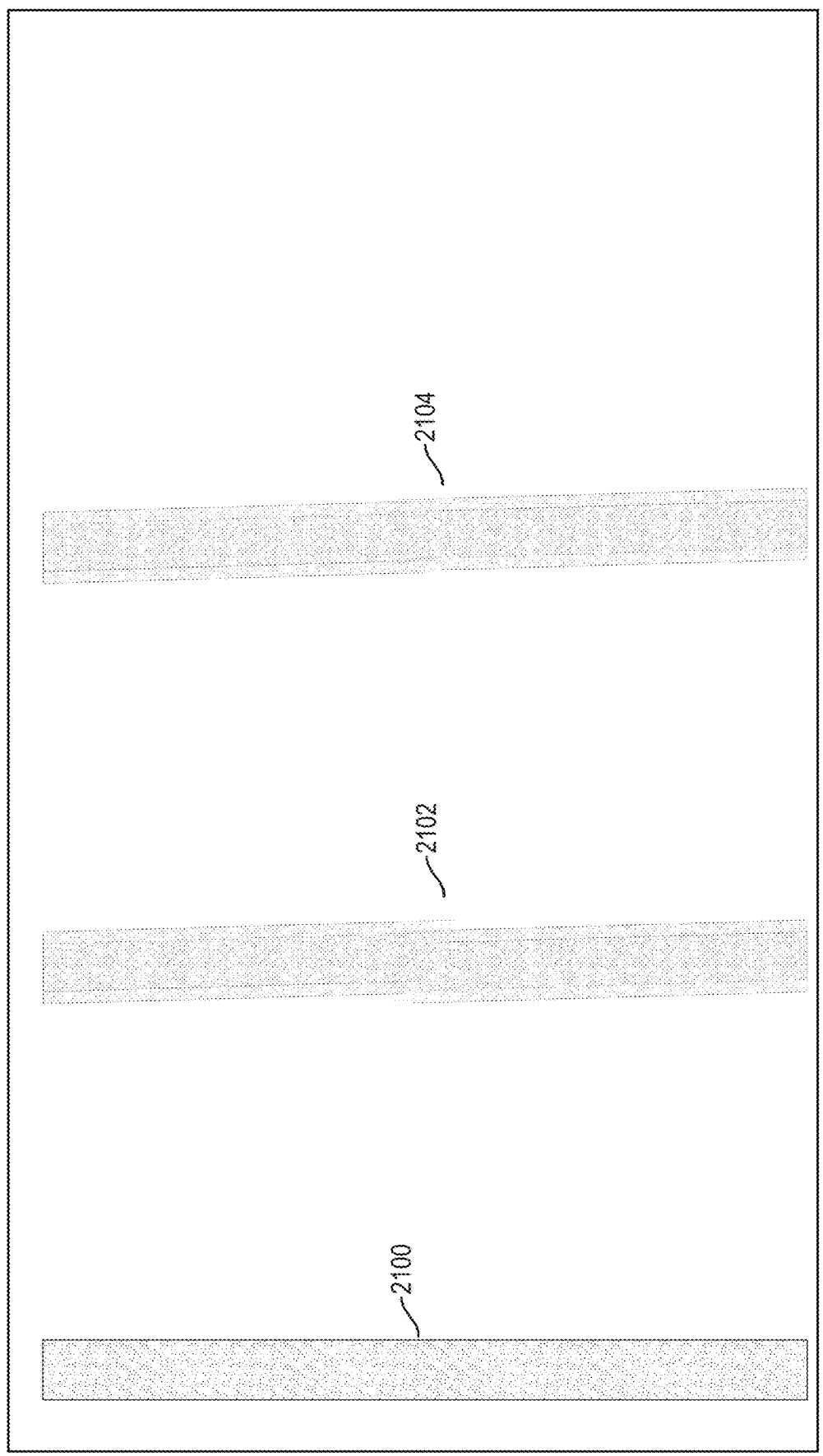

According to various embodiments, the misstitch may further be reduced by minimizing fly-back time and/or minimizing the number of rows that overlap. Reducing the fly-back time and the number of overlapping rows to zero would eliminate the misstitch from the displayed image frame, as shown in FIG. 21. Using conventional systems, the virtual object 2100 may be displayed on a display device with misstitch 2102. Reducing the fly-back time and the number of overlapping rows to zero eliminates the misstitch from the displayed image frame 2104.

System Architecture Overview

Figure 22:
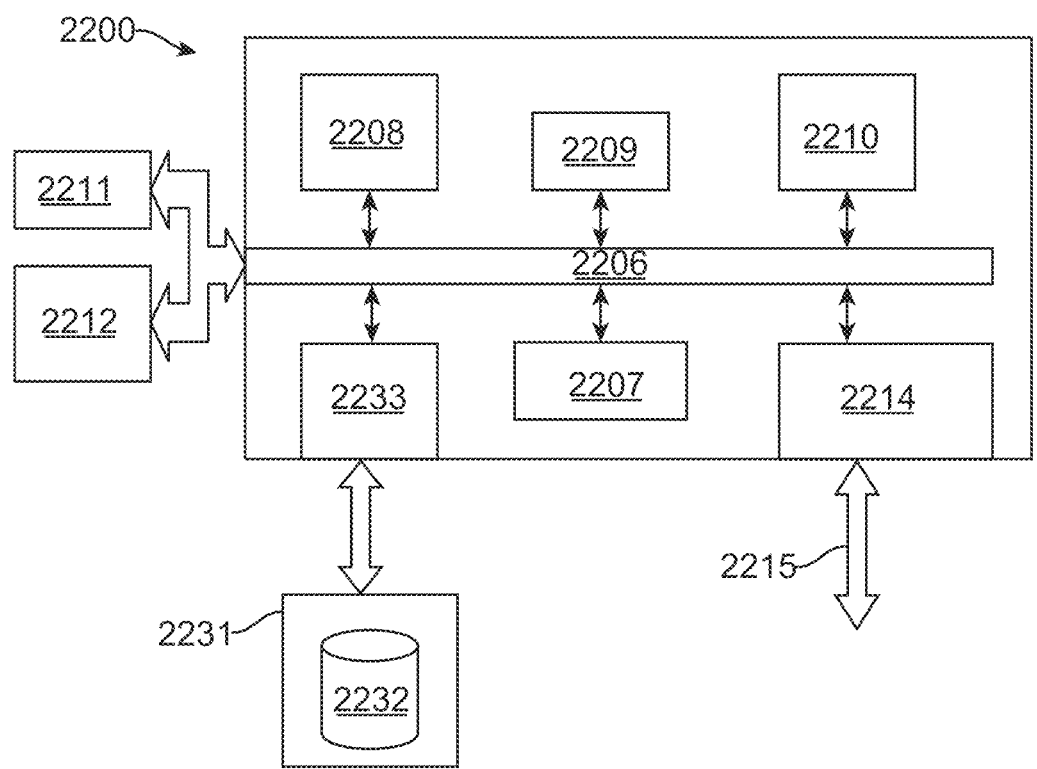
FIG. 22 is a block diagram schematically depicting an illustrative computing system, according to some embodiments.

FIG. 22 is a block diagram of an illustrative computing system 2200 (e.g. an MR device), according to some embodiments. Computer system 2200 includes a bus 2206 or other communication mechanism for communicating information, which interconnects subsystems and devices, such as processor 2207, system memory 2208 (e.g., RAM), static storage device 2209 (e.g., ROM), disk drive 2210 (e.g., magnetic or optical), communication interface 2214

(e.g., modem or Ethernet card), display 2211 (e.g., CRT or LCD), input device 2212 (e.g., keyboard), and cursor control.

According to some embodiments, computer system 2200 performs specific operations by processor 2207 executing one or more sequences of one or more instructions contained in system memory 2208. Such instructions may be read into system memory 2208 from another computer readable/usable medium, such as static storage device 2209 or disk drive 2210. In alternative embodiments, hard-wired circuitry may be used in place of or in combination with software instructions to implement the disclosure. Thus, embodiments are not limited to any specific combination of hardware circuitry and/or software. The term "logic" shall mean any combination of software or hardware that is used to implement all or part of the disclosure.

The term "non-transitory computer readable medium" or "computer usable medium" as used herein refers to any medium that participates in providing instructions to processor 2207 for execution. Such a medium may take many forms, including but not limited to, non-volatile media and volatile media. Non-volatile media includes, for example, optical or magnetic disks, such as disk drive 2210. Volatile media includes dynamic memory, such as system memory 2208.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In some embodiments, execution of the sequences of instructions to practice the disclosure is performed by a single computer system 2200. According to some embodiments, two or more computer systems 2200 coupled by communication link 2215 (e.g., LAN, PTSN, or wireless network) may perform the sequence of instructions required to practice the disclosure in coordination with one another.

Computer system 2200 may transmit and receive messages, data, and instructions, including program, i.e., application code, through communication link 2215 and communication interface 2214. Received program code may be executed by processor 507 as it is received, and/or stored in disk drive 2210, or other non-volatile storage for later execution. Database 2232 in storage medium 2231 may be used to store data accessible by computer system 2200 via data interface 2233.

The disclosure includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A method for transforming an image frame based on a position of pupils of a viewer, the method comprising:
   obtaining, by a computing device, a first image frame, wherein the first image frame corresponds to a first view perspective associated with a first position of the pupils of the viewer;
   determining, by the computing device, a second position of the pupils of the viewer, wherein the first position of the pupils and the second position of the pupils are determined with respect to a head position of the viewer, wherein the first position of the pupils is determined at a first point in time where a first set of pixels are to be displayed on a near-eye display device, wherein the second position of the pupils is determined at a second point in time where a second set of pixels are to be displayed on the near-eye display device;

generating, by the computing device and based on the first image frame, a second image frame corresponding to a second view perspective associated with the second position of the pupils of the viewer, the generating comprising:

shifting the first set of pixels of the second image frame by a first shift value calculated based on at least the second position of the pupils of the viewer, and shifting the second set of pixels of the second image frame by a second shift value calculated based on at least the second position of the pupils of the viewer, wherein the first set of pixels are provided on a first row of the near-eye display device and the second set of pixels are provided on a second row of the near-eye display device; and transmitting, by the computing device, the second image frame to the near-eye display device to be displayed on the near-eye display device.

2. The method of claim 1, further comprising:
receiving, by the computing device from an eye tracking device, data associated with the position of the pupils of the viewer, wherein the second position of the pupils is determined based on the data received from the eye tracking device.

3. The method of claim 1, wherein the first view perspective is also associated with a first head position of the viewer, the method further comprising:

estimating, by the computing device, a second head position of the viewer; and generating, by the computing device, an intermediary warped image frame from the first image frame using the second head position of the viewer, wherein the second image frame is generated using the intermediary warped image frame.

4. The method of claim 1, wherein the near-eye display device is a laser beam scanning display that displays data on pixels of the near-eye display device according to a predetermined scanning pattern, wherein data is displayed on a first set of pixels of the near-eye display device at a different moment in time than on a second set of pixels of the near-eye display device.

5. The method of claim 4, wherein the laser beam scanning display includes at least two lasers scanning simultaneously.

6. The method of claim 1, wherein the position of the pupils is determined with respect to pixels of the near-eye display device.

7. The method of claim 1, further comprising:
calculating a first eye velocity as a function of the first position of the pupils, the second position of the pupils and a time elapsed for the pupils of the viewer to get from the first position to the second position, wherein the first eye velocity is calculated with respect to the near-eye display device;
calculating a second eye velocity; and
calculating, by the computing device, the first shift value based on the first eye velocity and the second shift value based on the second eye velocity, wherein the first eye velocity is calculated right before the first set of pixels are shifted by the first shift value.

8. The method of claim 1, further comprising:
calculating, by the computing device, the second shift value based on the first shift value and a subsequent position of the pupils of the viewer.

9. A system comprising:
one or more processors configured to execute instructions to:

obtain a first image frame, wherein the first image frame corresponds to a first view perspective associated with a first position of pupils of a viewer;

determine a second position of the pupils of the viewer, wherein the first position of the pupils and the second position of the pupils are determined with respect to a head position of the viewer, wherein the first position of the pupils is determined at a first point in time where a first set of pixels are to be displayed on a display device, wherein the second position of the pupils is determined at a second point in time where a second set of pixels are to be displayed on the display device;

generate, based on the first image frame, a second image frame corresponding to a second view perspective associated with the second position of the pupils of the viewer, generating comprising:

shifting the first set of pixels of the second image frame by a first shift value calculated based on at least the second position of the pupils of the viewer, and shifting the second set of pixels of the second image frame by a second shift value calculated based on at least the second position of the pupils of the viewer, wherein the first set of pixels are provided on a first row of the display device and the second set of pixels are provided on a second row of the display device; and transmit the second image frame to the display device to be displayed on the display device; and a display device configured to:
display the second image frame.

10. The system of claim 9, further comprising:
an eye tracking device configured to:
track the pupils of the viewer; and
transmit data associated with the position of the pupils of the viewer to the one or more processors, wherein the second position of the pupils is determined based on the data received from the eye tracking device.

11. The system of claim 9, wherein the first view perspective is also associated with a first head position of the viewer, wherein the one or more processors are further configured to execute instructions to:

estimate a second head position of the viewer; and generate an intermediary warped image frame from the first image frame using the second head position of the viewer, wherein the second image frame is generated using the intermediary warped image frame.

12. The system of claim 9, wherein the display device is a laser beam scanning display that displays data on pixels of the display device according to a predetermined scanning pattern, wherein data is displayed on a first set of pixels of the display device at a different moment in time than on a second set of pixels of the display device.

13. The system of claim 12, wherein the laser beam scanning display includes at least two lasers scanning simultaneously.

14. The system of claim 9, wherein the position of the pupils is determined with respect to pixels of the display device.

15. The system of claim 9, wherein the first view perspective is also associated with a first head position of the viewer, wherein the one or more processors are further configured to execute instructions to:
- calculate a first eye velocity as a function of the first position of the pupils, the second position of the pupils and a time elapsed for the pupils of the viewer to get from the first position to the second position, wherein the first eye velocity is calculated with respect to the display device;
- calculate a second eye velocity; and
- calculate the first shift value based on the first eye velocity and the second shift value based on the second eye velocity, wherein the first eye velocity is calculated right before the first set of pixels are shifted by the first shift value.

16. The system of claim 9, wherein the first view perspective is also associated with a first head position of the viewer, wherein the one or more processors are further configured to execute instructions to:
- calculate the second shift value based on the first shift value and a subsequent position of the pupils of the viewer.

17. A non-transitory computer-readable medium having stored thereon a sequence of instructions which, when executed by one or more processors, causes the processors to:
- obtain a first image frame, wherein the first image frame corresponds to a first view perspective associated with a first position of pupils of a viewer;
- determine a second position of the pupils of the viewer, wherein the first position of the pupils and the second position of the pupils are determined with respect to a head position of the viewer, wherein the first position of the pupils is determined at a first point in time where a first set of pixels are to be displayed on a near-eye display device, wherein the second position of the pupils is determined at a second point in time where a second set of pixels are to be displayed on the near-eye display device;
- generate, based on the first image frame, a second image frame corresponding to a second view perspective associated with the second position of the pupils of the viewer, the generating comprising:
  - shifting the first set of pixels of the second image frame by a first shift value calculated based on at least the second position of the pupils of the viewer, and
  - shifting the second set of pixels of the second image frame by a second shift value calculated based on at least the second position of the pupils of the viewer, wherein the first set of pixels are provided on a first row of the near-eye display device and the second set of pixels are provided on a second row of the near-eye display device; and
- transmit the second image frame to a near-eye display device to be displayed on the near-eye display device.

18. The non-transitory computer-readable medium of claim 17, wherein the sequence of instructions which, when executed by one or more processors, further causes the processors to:
- calculate a first eye velocity as a function of the first position of the pupils, the second position of the pupils and a time elapsed for the pupils of the viewer to get from the first position to the second position, wherein the first eye velocity is calculated with respect to the near-eye display device;
- calculate a second eye velocity; and
- calculate the first shift value based on the first eye velocity and the second shift value based on the second eye velocity, wherein the first eye velocity is calculated right before the first set of pixels are shifted by the first shift value.

\* \* \* \* \*